(12) United States Patent
Medaglia et al.

(10) Patent No.: US 10,385,958 B2
(45) Date of Patent: Aug. 20, 2019

(54) CHAINRINGS AND CRANK ASSEMBLIES

(71) Applicant: SRAM, LLC, Chicago, IL (US)

(72) Inventors: Anthony Medaglia, San Luis Obispo, CA (US); Joseph Wilson, San Luis Obispo, CA (US)

(73) Assignee: SRAM, LLC, Chicago, IL (US)

( * ) Notice: Subject to any disclaimer, the term of this patent is extended or adjusted under 35 U.S.C. 154(b) by 121 days.

(21) Appl. No.: 15/438,301

(22) Filed: Feb. 21, 2017

(65) Prior Publication Data

US 2017/0159792 A1 Jun. 8, 2017

Related U.S. Application Data

(63) Continuation of application No. 14/620,535, filed on Feb. 12, 2015, now Pat. No. 9,599,208.

(51) Int. Cl.
| | |
|---|---|
| *B62M 3/00* | (2006.01) |
| *B62M 9/00* | (2006.01) |
| *B62M 9/02* | (2006.01) |
| *B62M 9/10* | (2006.01) |
| *F16H 55/12* | (2006.01) |
| *F16H 55/30* | (2006.01) |

(52) U.S. Cl.
CPC ............... *F16H 55/30* (2013.01); *B62M 3/00* (2013.01); *B62M 9/00* (2013.01); *B62M 9/02* (2013.01); *B62M 9/10* (2013.01); *B62M 9/105* (2013.01); *F16H 55/12* (2013.01); *F16H 2055/306* (2013.01)

(58) Field of Classification Search
CPC .......... F16H 55/30; F16H 55/12; B62M 9/10; B62M 9/105; Y10T 74/1993
USPC ......................................... 474/152, 160, 161
See application file for complete search history.

(56) References Cited

U.S. PATENT DOCUMENTS

| | | | | |
|---|---|---|---|---|
| 1,115,557 | A * | 11/1914 | Livermore | F16H 55/06 74/439 |
| 1,870,801 | A * | 8/1932 | Engstrom | B62D 55/0963 474/156 |
| 2,764,900 | A * | 10/1956 | Warsmith | F16H 55/06 474/162 |
| 3,439,551 | A * | 4/1969 | Militana | F16H 55/12 474/162 |
| 3,504,562 | A * | 4/1970 | Hirych | B62D 55/0963 305/199 |
| 3,745,851 | A * | 7/1973 | Zeldman | B21H 5/02 29/893.32 |
| 3,889,550 | A * | 6/1975 | Boggs | B62D 55/0963 474/161 |

(Continued)

FOREIGN PATENT DOCUMENTS

| | | |
|---|---|---|
| CN | 101134492 | 3/2008 |
| EP | 0008851 A1 | 3/1980 |

(Continued)

*Primary Examiner* — Henry Y Liu

(57) ABSTRACT

A chainring for a bicycle includes a body and a plurality. The plurality of teeth are disposed about a periphery of the body. The plurality of teeth have a tooth body formed of a first material and include a load flank. The plurality of teeth also include an insert formed of a second material. The insert is coupled to a tooth body of the plurality of teeth forming a load flank surface of the plurality of teeth.

14 Claims, 19 Drawing Sheets

(56) References Cited

U.S. PATENT DOCUMENTS

| | | | | |
|---|---|---|---|---|
| 3,916,708 A * | 11/1975 | Durand | ............. | B62D 55/0963 474/161 |
| 3,999,445 A * | 12/1976 | Liautaud | ........... | B29C 45/14311 74/445 |
| 4,111,064 A * | 9/1978 | Purcell | .................... | F16H 55/12 474/162 |
| 4,384,865 A * | 5/1983 | Ueno | ...................... | B62M 9/10 474/160 |
| 4,472,164 A * | 9/1984 | Pusch | ................. | B62D 55/125 305/199 |
| 4,527,987 A * | 7/1985 | Berchem | ................. | C22C 38/44 148/224 |
| 4,598,608 A * | 7/1986 | Ueno | ................... | B62M 9/105 474/160 |
| 4,867,733 A * | 9/1989 | Yamanoi | ................. | B62M 9/00 474/161 |
| 4,988,328 A * | 1/1991 | Iwasaki | ................. | B62M 9/105 474/160 |
| 5,133,695 A * | 7/1992 | Kobayashi | ............. | B62M 9/105 474/160 |
| 5,213,550 A * | 5/1993 | Wu | ........................ | B62M 9/105 474/160 |
| 5,636,911 A * | 6/1997 | Korpi | .................... | B62D 55/12 305/193 |
| 5,829,850 A * | 11/1998 | Ketting | ................. | B62D 55/21 305/194 |
| 5,967,924 A * | 10/1999 | Kwon | ................... | F16H 55/30 474/161 |
| 6,071,204 A * | 6/2000 | Jefferies | ................. | F16H 55/30 474/161 |
| 6,843,540 B2 * | 1/2005 | Kanzler | ................. | B62D 55/12 305/195 |
| 7,018,313 B2 * | 3/2006 | Nakamura | ............. | F16H 55/30 474/152 |
| 7,022,037 B2 * | 4/2006 | Valle | ........................ | B62M 9/10 474/152 |
| 7,032,983 B2 * | 4/2006 | Wu | ........................ | F16H 55/14 305/195 |
| 7,097,580 B2 * | 8/2006 | Sakamoto | ............... | F16H 55/30 474/152 |
| 7,179,341 B2 * | 2/2007 | Harakawa | ................. | B22F 5/08 148/318 |
| 7,442,140 B2 * | 10/2008 | Valle | ........................ | B62M 9/10 474/152 |
| 7,824,287 B2 * | 11/2010 | Nonoshita | ............. | B62M 9/105 474/152 |
| 8,287,238 B2 * | 10/2012 | DiMascio | .............. | F16H 55/12 415/129 |
| 8,617,015 B2 * | 12/2013 | Wickliffe | ................ | F16H 55/30 474/160 |
| 9,328,814 B2 * | 5/2016 | Wesling | .................. | F16H 55/06 |
| 9,404,565 B2 * | 8/2016 | Pfeiffer | .................... | B62M 9/10 |
| 9,440,706 B2 * | 9/2016 | Iwai | ........................ | B62M 9/105 |
| 9,555,855 B2 * | 1/2017 | Iwai | ........................ | B62M 9/105 |
| 9,581,231 B2 * | 2/2017 | Pfeiffer | ................... | F16H 55/30 |
| 9,625,027 B2 * | 4/2017 | Pfeiffer | ................... | F16H 55/30 |
| 9,829,085 B2 * | 11/2017 | Iwai | ........................ | F16H 55/303 |
| 9,869,382 B2 * | 1/2018 | Wesling | .................. | F16H 55/06 |
| 2002/0193194 A1 * | 12/2002 | Okabe | ..................... | F01L 1/022 474/152 |
| 2004/0017108 A1 * | 1/2004 | Moebs | ................. | B62D 55/096 305/125 |
| 2004/0110590 A1 * | 6/2004 | Renshaw | .................. | B62M 9/10 474/152 |
| 2004/0116223 A1 * | 6/2004 | Harakawa | ................. | B22F 5/08 474/152 |
| 2005/0090347 A1 * | 4/2005 | Revankar | .................. | C23C 2/28 474/152 |
| 2005/0272545 A1 * | 12/2005 | Yamanishi | ............... | B22F 3/164 474/152 |
| 2007/0054768 A1 * | 3/2007 | Miyazawa | ............. | F16H 55/30 474/152 |
| 2007/0089555 A1 * | 4/2007 | Tomoda | .................. | B29C 45/16 74/443 |
| 2007/0173364 A1 * | 7/2007 | Renshaw | ................ | F16H 55/30 474/160 |
| 2010/0081530 A1 * | 4/2010 | Crump | ..................... | B21K 1/30 474/152 |
| 2013/0143704 A1 * | 6/2013 | Blank | ....................... | B62M 9/10 474/161 |
| 2014/0335983 A1 * | 11/2014 | Iwai | ........................ | B62M 9/105 474/78 |
| 2014/0335987 A1 * | 11/2014 | Iwai | ........................ | B62M 9/10 474/161 |
| 2015/0285362 A1 * | 10/2015 | Pfeiffer | ................... | F16H 55/30 474/152 |
| 2015/0285363 A1 * | 10/2015 | Pfeiffer | ................... | F16H 55/30 474/152 |
| 2015/0285364 A1 * | 10/2015 | Pfeiffer | ................... | F16H 55/30 474/152 |

FOREIGN PATENT DOCUMENTS

| | | |
|---|---|---|
| EP | 0034445 A2 | 8/1981 |
| TW | M27181 | 8/2005 |
| TW | 200722339 | 6/2007 |
| TW | 201538870 A | 10/2015 |
| TW | 201542419 A | 11/2015 |

* cited by examiner

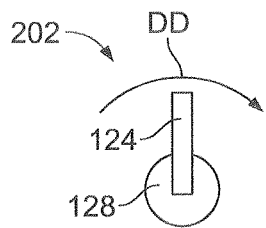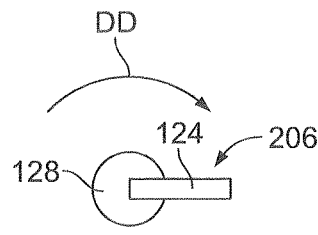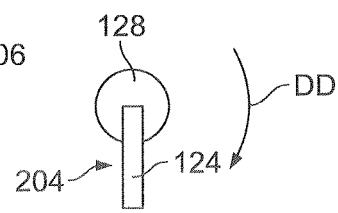
FIG. 2A    FIG. 2B    FIG. 2C
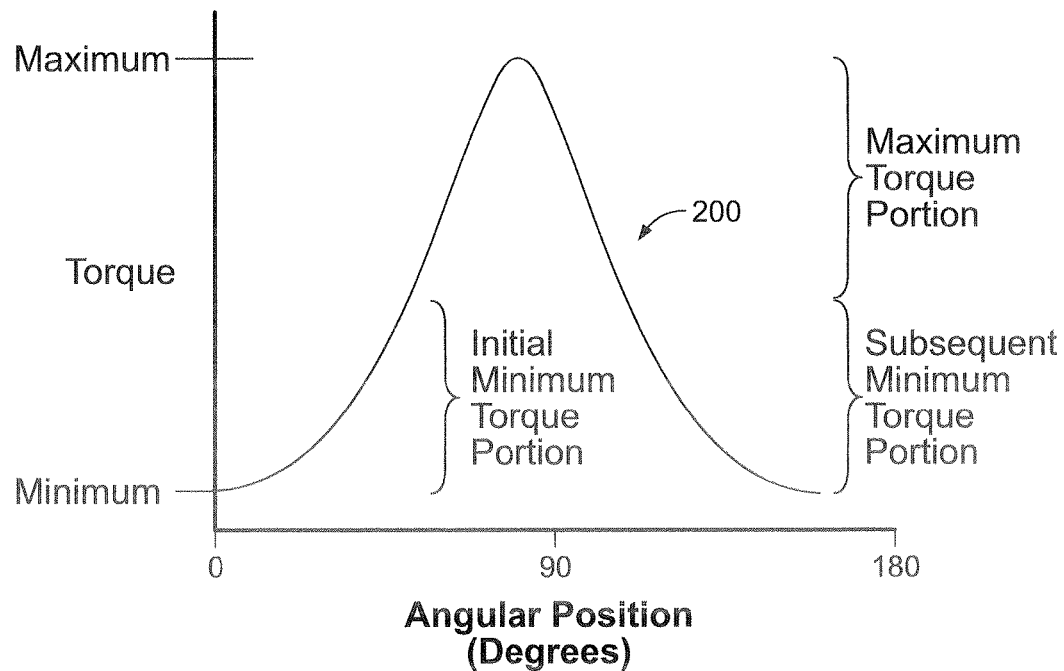
FIG. 2

CHAINRINGS AND CRANK ASSEMBLIES

This application is a continuation of U.S. patent application Ser. No. 14/620,535, filed Feb. 12, 2015, the disclosure of which is herein included by reference in its entirety.

BACKGROUND OF THE INVENTION

1. Field of the Background

This disclosure relates to bicycle drive trains and, more particularly, to crank assemblies and chainrings.

2. Description of the Background

A drive train of a bicycle often includes a chain operatively coupling a crank assembly to a sprocket disposed on a rear wheel of the bicycle. The crank assembly typically employs one or more chainrings and two crank arms. During use of the bicycle, the user applies force to pedals coupled to the crank arms to rotate the chainring. As a result, the chainring drives a chain, which rotates the rear wheel. During operation of the chainring, the chainring experiences wear.

SUMMARY

According to one aspect, a chainring for a bicycle includes a body. The chainring also includes a plurality of teeth disposed about a periphery of the body, the plurality of teeth formed of a first material and comprising a first tooth having a first load flank having a first load flank surface and a second tooth adjacent to the first tooth and having a second load flank. The second tooth includes an insert coupled to a tooth body of the second tooth, the insert forming a second load flank surface of the second tooth.

According to one aspect, a chainring for a bicycle includes a body. The chainring also includes a plurality of teeth disposed about a periphery of the body. The plurality of teeth each having a tooth body formed of a first material and including an insert formed of a second material. The insert is coupled to the tooth body of the plurality of teeth forming a load flank surface of the plurality of teeth.

According to one aspect, a chainring includes a first section having consecutive first teeth. Each of the first teeth includes a first load flank surface having a first wear resistance. The chainring also includes a second section coupled to the first section. The second section includes consecutive second teeth. Each of the second teeth includes a second load flank surface having a second wear resistance greater than the first wear resistance. The consecutive second teeth span an arc length corresponding to between one twelfth and one third of a circumference of a pitch circle of the chainring.

According to another aspect, a chainring includes a first tooth having a first load flank surface of a first wear resistance. The chainring also includes a second tooth having a second load flank surface of a second wear resistance greater than the first wear resistance. The chainring further includes a third tooth disposed consecutively with the second tooth, the third tooth having a third load flank surface of the second wear resistance. The second tooth has a different thickness than the third tooth.

According to another aspect, a crank assembly includes a chainring having first teeth and second teeth. The first teeth each include a first load flank surface of a first wear resistance. The second teeth each include a second load flank surface of a second wear resistance greater than the first wear resistance. The crank assembly also includes a crank arm coupled to the chainring. The second teeth are consecutively disposed on the chainring between more than 60 degrees and less than 110 degrees relative a longitudinal axis of the crank arm in a direction opposite a driving direction.

According to another aspect, a crank assembly includes a crank arm and only one chainring coupled to the crank arm. The chainring includes a first tooth and a second tooth. The first tooth includes a first load flank surface having a first wear resistance. The second tooth includes a second load flank surface having a second wear resistance greater than the first wear resistance. The second tooth is in a position on the chainring relative to the crank arm that is to enable the second tooth to apply a maximum force to a chain during a maximum torque portion of a pedaling cycle of the crank arm.

According to another aspect, a chainring has a body having a first tooth and a second tooth. The first tooth has a first load flank surface of a first wear resistance. The chainring also includes an insert coupled to the second tooth and forming a second load flank surface of the second tooth. The second load flank surface has a second wear resistance greater than the first wear resistance.

According to another aspect, a crank assembly has a first section of a chainring including first teeth of a first material. The crank assembly also includes a second section of the chainring coupled to the first section. The second section includes second teeth of a second material different than the first material. The crank assembly further includes a carrier including an arm overlapping the second section of the chainring.

BRIEF DESCRIPTION OF THE DRAWINGS

FIG. 2 is a graph representative of torque outputs of a rider of the bicycle of FIG. 1 during a pedaling cycle of a crank assembly;

FIGS. 2A-2C illustrate various angular positions of the crank assembly of FIG. 2;

Other aspects and advantages of the embodiments disclosed herein will become apparent upon consideration of the following detailed description, wherein similar or identical structures have similar reference numerals.

DETAILED DESCRIPTION

Figure 1:
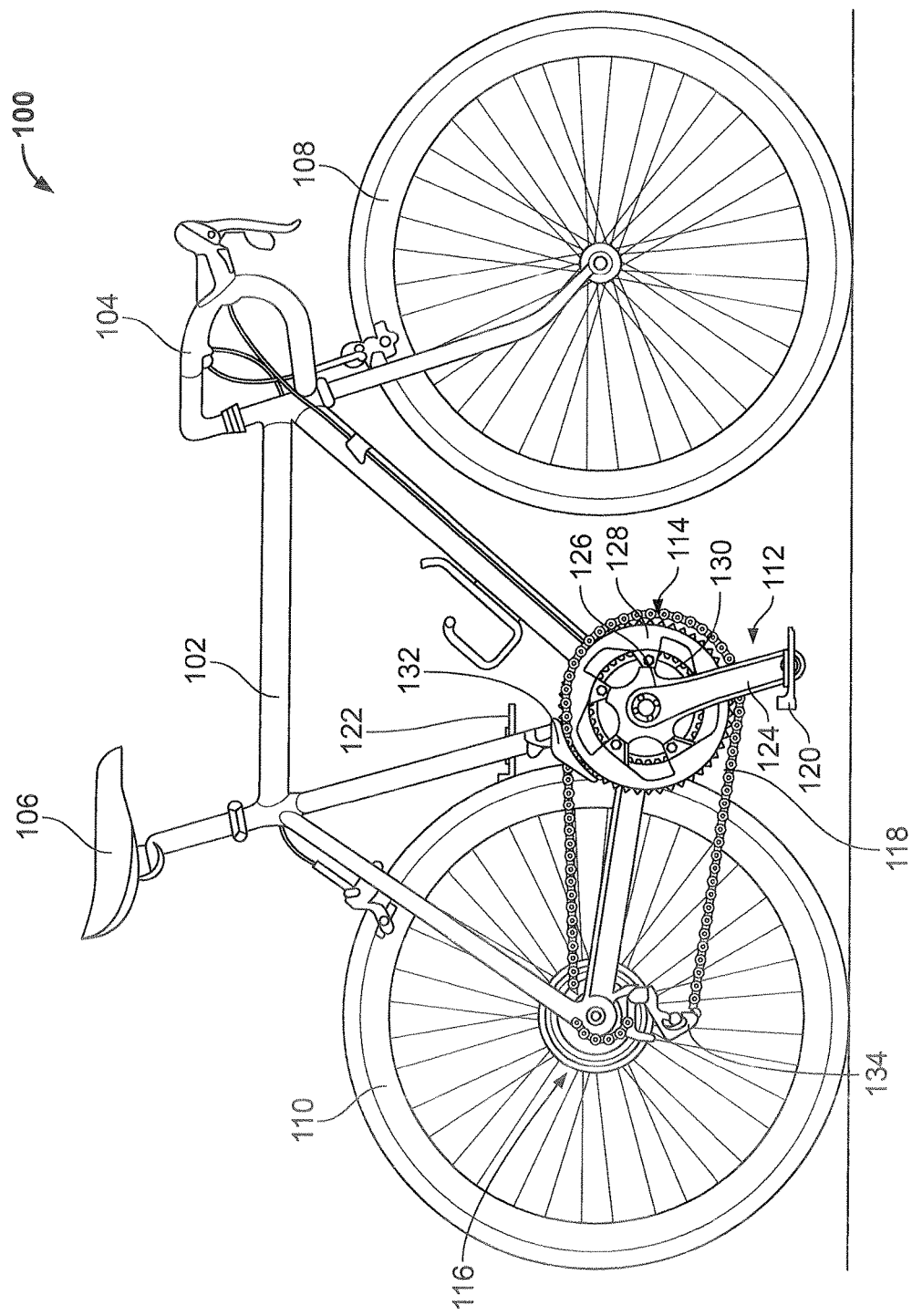
FIG. 1 is a side elevational view of an exemplary bicycle, which may employ the example chainrings and crank assemblies disclosed herein.

FIG. 1 illustrates an example bicycle 100, which may be used to implement the crank assemblies and chainrings disclosed herein. In the illustrated embodiment, the bicycle 100 includes a frame 102, handlebars 104, and a seat 106. The bicycle 100 also includes a first or front wheel 108 and a second or rear wheel 110. The bicycle 100 includes a drive train 112. The drive train 112 of FIG. 1 includes a crank assembly 114, a gear cluster or cassette 116, and a chain 118 operatively coupling the crank assembly 114 to the cassette 116. The crank assembly 114 is rotatably coupled to the frame 102, and the cassette 116 is non-rotatably coupled to the rear wheel 110 in the drive direction.

In the illustrated embodiment, the crank assembly 114 includes a first pedal 120, a second pedal 122, a first crank arm 124, a second crank arm (see, e.g., FIG. 3), a carrier 126, a first chainring 128, and a second chainring 130. Although the example crank assembly 114 has two chainrings (i.e., the first chainring 128 and the second chainring 130), other crank assemblies disclosed herein have different numbers of chainrings (e.g., 1, 3, 4, etc.). For example, the crank assembly 300 of FIG. 3 has only one chainring.

The first pedal 120 is rotatably coupled to the first crank arm 124. The second pedal 122 is rotatably coupled to the second crank arm. In the illustrated embodiment, the first crank arm 124 and the second crank arm are non-rotatably coupled to the carrier 126, and the carrier 126 is non-rotatably coupled to the first chainring 128 and the second chainring 130. In FIG. 1, the first chainring 128 is selectively engaging the chain 118. However, the second chainring 130 may selectively engage the chain 118. For example, the drive train 112 of FIG. 1 includes a front derailleur 132 to move the chain 118 out of engagement with the first chainring 128 and into engagement with the second chainring 130. The front derailleur 132 may also move the chain 118 out of engagement with the second chainring 130 and into engagement with the first chainring 128. A rear derailleur 134 moves the chain 118 between a plurality of sprockets of the cassette 116.

FIG. 2 is a graph 200 representative of torque outputs of a rider of the bicycle 100 during a pedaling cycle of the crank assembly 114. The graph 200 is also representative of the torque outputs of a rider of a bicycle employing the crank assemblies and chainrings disclosed below with reference to FIGS. 3-22. Thus, the following description of the following pedaling cycle is also applicable to the crank assemblies and chainrings of FIGS. 3-22.

In the illustrated embodiment, the pedaling cycle of the crank assembly 114 occurs when the rider of the bicycle 100 pedals the first crank arm 124 by 180 degrees from a substantially vertical, top or first position 202 (see FIG. 2A) to a substantially vertical, bottom or second position 204 (see FIG. 2C) in a driving direction DD. In the illustrated embodiment, a peak or maximum torque output during the pedaling cycle occurs during a maximum torque portion of the pedaling cycle in which the first crank arm 124 is in or near a third or horizontal position 206 (see FIG. 2B) as the rider pedals the first crank arm 124 from the first position toward the second position. Looking to FIG. 2, the maximum torque portion of the pedaling cycle occurs between 60 and 100 degrees. A minimum torque output occurs during at least one of an initial minimum torque portion of the pedaling cycle in which the first crank arm 124 is near or in the first position 202 or a subsequent minimum torque portion of the pedaling cycle in which the first crank arm 124 is near or in the second position 204 as the rider pedals the first crank arm 124. As used in this patent, the verbs "pedals" and "pedaling" means applying force to a crank arm (e.g., the first crank arm 124 of FIG. 1) via a pedal (e.g., the first pedal 120) to rotate a chainring (e.g., the first chainring 128 and/or the second chainring 130) to drive a chain (e.g., the chain 118) of a bicycle.

Figure 3:
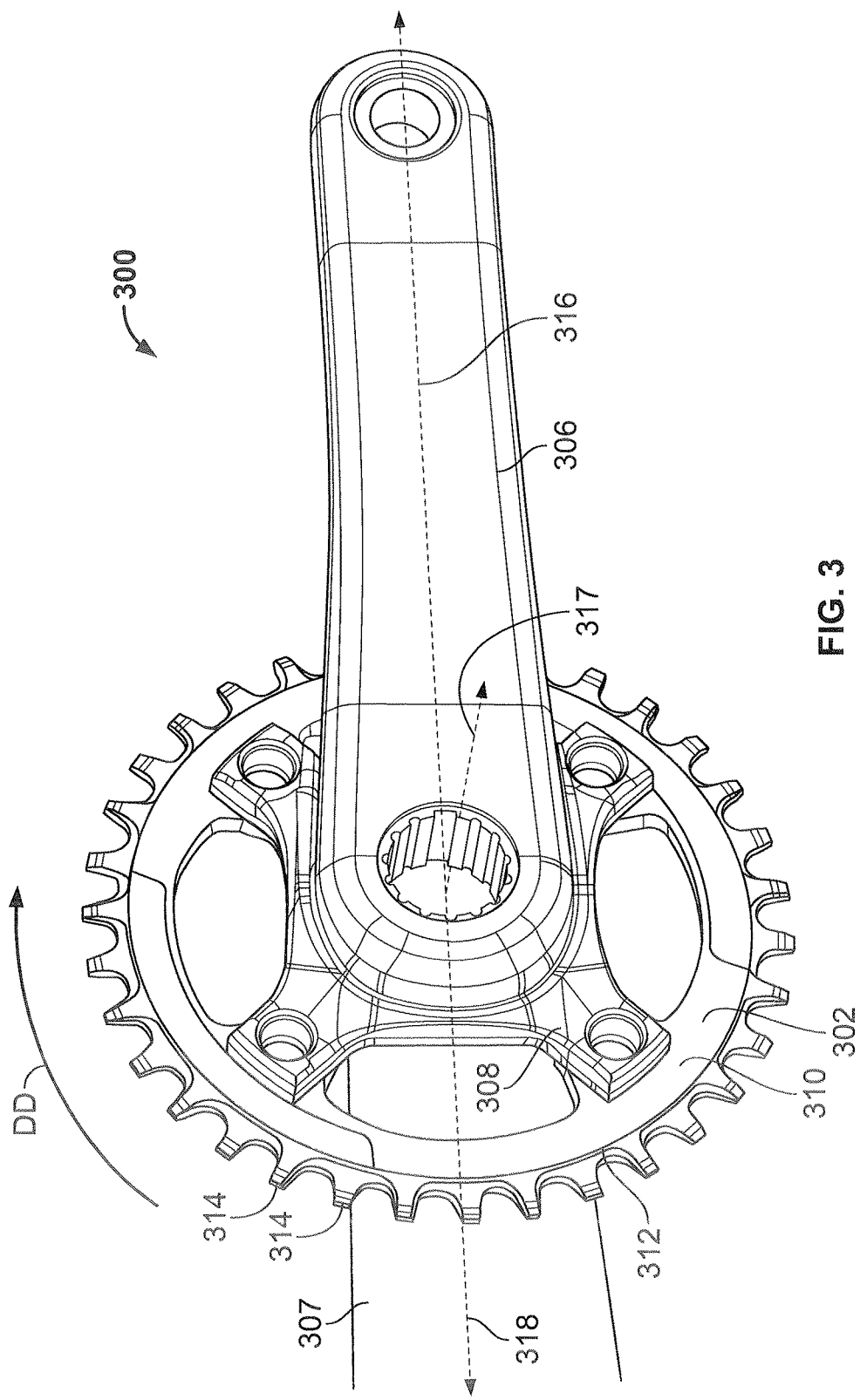
FIG. 3 is an outboard side, perspective view of a crank assembly.
Figure 4:
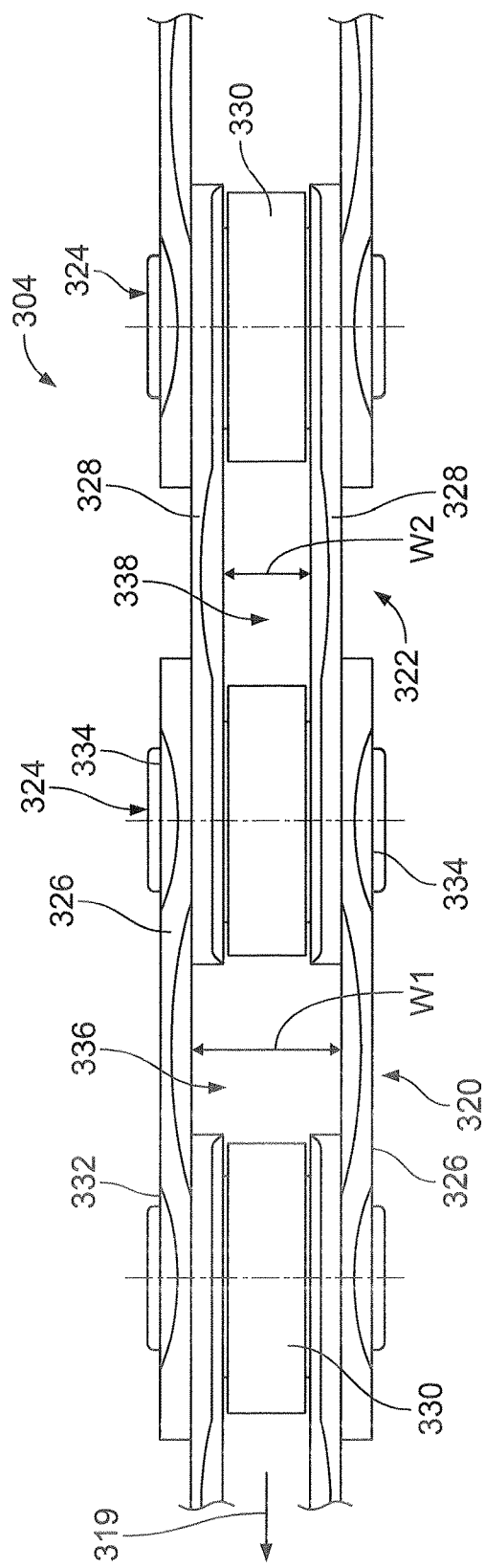
FIG. 4 is a top plan view of a chain, which may be driven by the crank assembly of FIG. 3.
Figure 5:
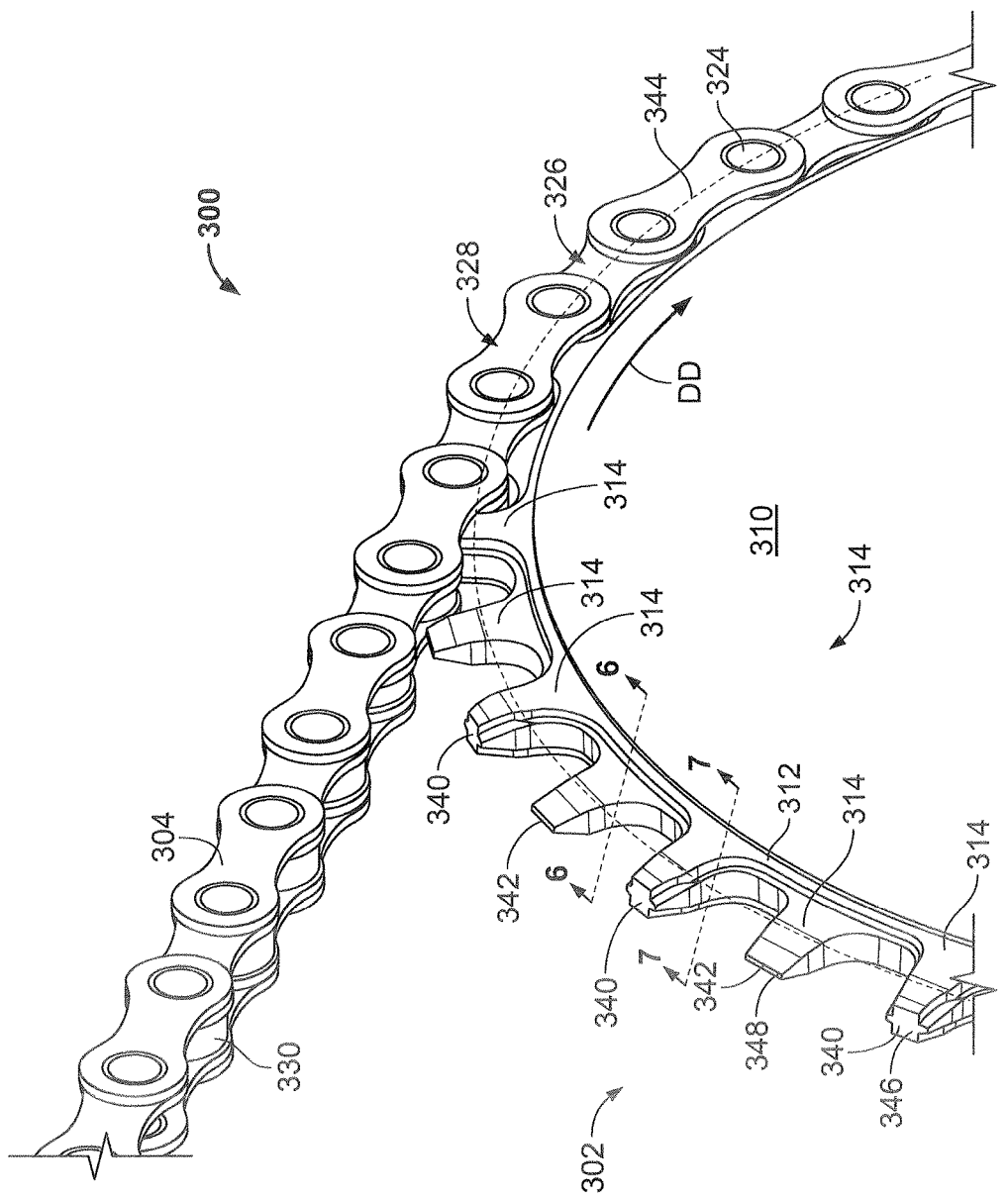
FIG. 5 is an outboard side, perspective view of a chainring of the crank assembly of FIG. 3 engaging the chain of FIG. 4.

FIGS. 3-5 illustrate one embodiment of a crank assembly 300, which may be used to implement the example bicycle 100 of FIG. 1. In the illustrated embodiment, the crank assembly 300 includes only one chainring 302. The chainring 302 engages a chain 304 (see FIGS. 4 and 5). With reference to FIG. 3, the crank assembly 300 also includes a first crank arm 306 and a second crank arm 307 coupled to a carrier 308. The second crank arm 307 and the carrier 308 may be form as one piece or separate. The second crank arm 307 is shown schematically in FIG. 3. The carrier 308 is coupled (e.g., nonrotatably coupled) to the chainring 302. The crank assembly 300 is a mirror image of the first crank arm 306.

In this embodiment, the chainring 302 includes a body 310 having a periphery 312. The chainring 302 also includes teeth 314 disposed on the periphery 312 of the body 310 for engagement with the chain 304. In the illustrated embodiment, the first crank arm 306 of FIG. 3 is substantially straight or linear and has a first longitudinal axis 316. Force applied to the first crank arm 306 in a driving direction DD rotates the chainring 302 in the driving direction about an axis of rotation 317. As a result, the chainring 302 draws over and advances the chain 304 via the teeth 314. The second crank arm 307 may be coupled to the carrier 308 such that a second longitudinal axis 318 of the second crank arm 307 is parallel to the longitudinal axis 316 of the first crank arm 306. In such embodiments, the chainring 302, the first crank arm 306, and the second crank arm 307 may rotate about the axis of rotation 317.

FIG. 4 is a top plan view of the chain 304, which may be driven by the chainring 302 of FIG. 3. The chain 304 has a central, longitudinal axis 319. The chain 304 includes outer chain links 320 and inner chain links 322. The inner chain links 322 are pivotally mounted on and coupled to the outer chain links 320 by pins 324. The outer chain links 320 are alternatingly interleaved with the inner chain links 322.

The outer chain links 320 have paired outer link plates 326 and the inner chain links 322 have paired inner link plates 328. Rollers 330 are arranged around the pins 324. The plates 326, 328 are provided with holes 332, and the pins 324 extend through and project out of the holes 332. In some embodiments, ends 334 of the pins 324 do not project out of the holes 332. In the illustrated embodiment, the pins 324 are riveted to the outer link plates 326 and the inner link plates 328. The outer chain links 320 are interleaved with the inner chain links 322 to define alternating outer link spaces 336 and inner links spaces 338. The outer link spaces 336 are openings defined by the outer link plates 326 and the rollers 330. The inner link spaces 338 are openings defined by the inner link plates 328 and the rollers 330.

The inner link spaces 338 are rectangular shaped. The outer link spaces 336 are "cross" or "plus-sign" shaped. A first distance or width W1 between an opposing pair of the outer link plates 326 is greater than a second distance or width W2 between an opposing pair of the inner link plates 328. For example, the second widths W2 of the inner link spaces 338 are substantially equal to a width of the rollers 330. The first widths W1 of the outer link spaces 336 are substantially equal to a sum of the width of a roller 330 and the thicknesses of the two adjacent inner link plates 328.

FIG. 5 is an enlarged, perspective view of the teeth 314 of the chainring 302 of FIG. 3 engaging the chain 304 of FIGS. 3 and 4. In the illustrated embodiment, each of the teeth 314 has one of two configurations. Each of the teeth 314 having a first configuration are referred to in this disclosure as outer link teeth 340. Each of the teeth 314 having a second configuration are referred to in this disclosure as inner link teeth 342. The outer link teeth 340 each have a shape and a size corresponding to the outer link spaces 336. The outer link teeth 340 are to be received in only the outer link spaces 336 of the chain 304 during operation of the crank assembly 300. The inner link teeth 342 have a shape and a size corresponding to the inner link spaces 338. The inner link teeth 342 are to be received in only the inner link spaces 338 of the chain 304 during operation of the crank assembly 300. Thus, in the illustrated embodiment, the outer link teeth 340 alternate with the inner link teeth 342 along the periphery 312 of the chainring 302. When the chain 304 engages the chainring 302, the rollers 300 of the chain 304 contacting the teeth 314 lie along a pitch circle 344 of the chainring 302. Each of the outer link teeth 340 has a first top land 346. Each of the inner link teeth 342 has a second top land 348. In the embodiment of FIG. 5, the first top lands 346 each have a greater thickness than the second top lands 348.

Figure 6:
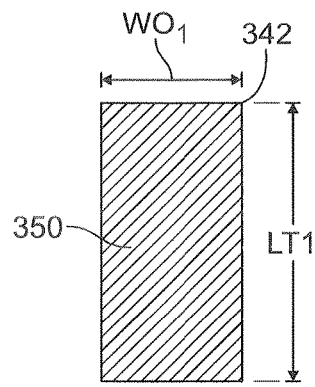
FIG. 6 is a cross-sectional view of an inner link tooth, which may be employed by the chainring of FIG. 5.

FIG. 6 is a cross-sectional view of one of the inner link teeth 342 ("an inner link tooth 342") taken from line 6-6 of FIG. 5, which is on a plane tangent to the pitch circle 344 of the chainring 302 and extending through a center 350 of the inner link tooth 342. The inner link teeth 342 are substantially similar or identical to each other. Therefore, the following description of the inner link tooth 342 of FIG. 6 is applicable to each of the other inner link teeth 342 of the chainring 302. Therefore, to avoid redundancy, the other inner link teeth 342 are not separately described herein.

The inner link tooth 342 has a rectangular cross-sectional shape from the perspective of FIG. 6. The inner link tooth 342 has a longitudinal length LT1. In the illustrated embodiment, the rectangular cross-sectional shape and a first tooth width WO1 of the inner link tooth 342 substantially matches the rectangular shape and the second width W2, respectively, of each of the inner link spaces 338 of the chain 304.

For example, the inner link tooth 342 may fill or occupy over about 75% of the second width W2 of one of the inner link spaces 338 when the inner link tooth 342 is fully received in the inner link space 338. In some embodiments, the inner link tooth 342 may fill or occupy over about 80% of the second width W2 of one of the inner link spaces 338 when the inner link tooth 342 is fully received in the inner link space 338. In some embodiments, the inner link tooth 342 may fill or occupy over about 85% of the second width W2 of one of the inner link spaces 338 when the inner link tooth 342 is fully received in the inner link space 338. In some embodiments, the inner link tooth 342 may fill or occupy different amounts of the second width W2 of one of the inner link spaces 338 when the inner link tooth 342 is fully received in the inner link space 338.

Figure 7:
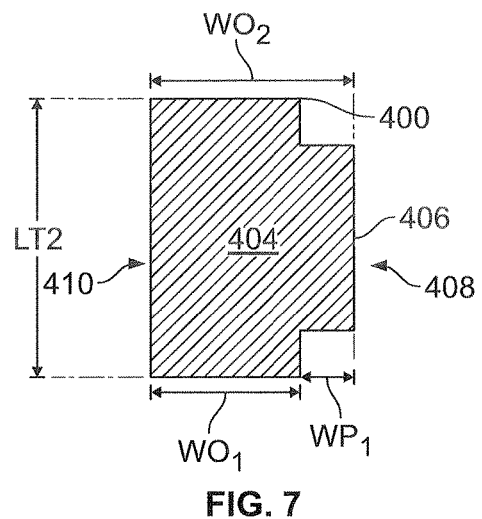
FIG. 7 is a cross-sectional view of an outer link tooth, which may be employed by the chainring of FIG. 5.

FIG. 7 is a cross-sectional view of an outer link tooth 400, which may be used to implement one or more of the outer link teeth 340 of FIGS. 3 and 5. The cross-sectional view of FIG. 7 is taken from line 7-7 of FIG. 5, which is on a plane tangent to the pitch circle 344 of the chainring 302 and extending through a center 402 of the outer link tooth 400. The outer link tooth 400 has a second longitudinal length LT2. In the illustrated embodiment, the second longitudinal length LT2 of the outer link tooth 400 is substantially the same as the first longitudinal length LT1 of the inner link tooth 342 of FIG. 6. In other embodiments, the second longitudinal length LT2 of the outer link tooth 400 is different than the first longitudinal length LT1 of the inner link tooth 342.

The outer link tooth 400 of FIG. 7 has a body 404 and an outboard protrusion 406 extending from an outboard side 408 of body 404. The body 404 of the outer link tooth 400 of FIG. 7 does not have a protrusion extending from an inboard side 410 of the body 404. The outboard protrusion 406 facilitates engagement between the outer link tooth 400 and the chain 304. In the illustrated embodiment, the outer link tooth 400 of FIG. 7 has a second tooth width WO2 greater than the first tooth width WO1. In the illustrated embodiment, the body 404 of the outer link tooth 400 has the first tooth width WO1 and the outboard protrusion 406 has a first protrusion width WP1.

As a result, the outer link tooth 400 may fill or occupy over about 75% of the first width W1 of one of the outer link spaces 336 when the outer link tooth 400 is fully received in the outer link space 336. In some embodiments, the outer link tooth 400 may fill or occupy over other amounts (e.g., more than 80%, more than 85%, etc.) of the first width W1 of one of the outer link spaces 336 when the outer link tooth 400 is fully received in the outer link space 336.

Figure 8:
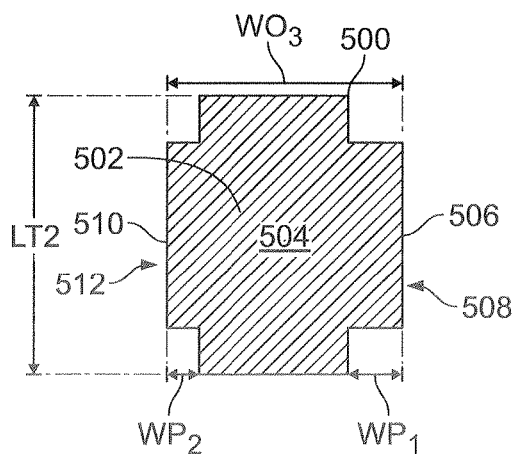
FIG. 8 is a cross-sectional view of an alternative outer link tooth disclosed herein.

FIG. 8 is a cross-sectional view of another example outer link tooth 500, which may be used to implement one or more of the outer link teeth 340 of FIGS. 3 and 5. The cross-sectional view of FIG. 8 is taken from line 7-7 of FIG. 5, which is on a plane tangent to the pitch circle 344 of the chainring 302 and extending through a center 502 of the outer link tooth 500. The outer link tooth 500 has the second longitudinal length LT2. In the illustrated embodiment, the second longitudinal length LT2 of the outer link tooth 500 is substantially the same as the first longitudinal length LT1 of the inner link tooth 342 of FIG. 6. In other embodiments, the second longitudinal length LT2 of the outer link tooth 500 is different than the first longitudinal length LT1 of the inner link tooth 342.

The outer link tooth 500 of FIG. 8 has a body 504 and an outboard protrusion 506 extending from an outboard side 508 of body 504. The body 504 of the outer link tooth 500 of FIG. 8 also has an inboard protrusion 510 extending from an inboard side 512 of the body 504. The outboard protrusion 506 and the inboard protrusion 510 facilitate engagement between the outer link tooth 500 and the chain 304. In the illustrated embodiment, the outer link tooth 500 of FIG. 8 has a third tooth width WO3 greater than the first tooth width WO1. In some embodiments, the third tooth width WO3 is greater than the second tooth WO2. In the illustrated embodiment, the outboard protrusion 506 has the first protrusion width WP1, and the inboard protrusion 510 has a second protrusion width WP2 less than the first protrusion width WP1.

As a result, the outer link tooth 500 may fill or occupy over about 75% of the first width W1 of one of the outer link spaces 336 when the outer link tooth 500 is fully received in the outer link space 336. In some embodiments, the outer link tooth 500 may fill or occupy over other amounts (e.g., more than 80%, more than 85%, etc.) of the first width W1 of one of the outer link spaces 336 when the outer link tooth 500 is fully received in the outer link space 336.

Figure 9:
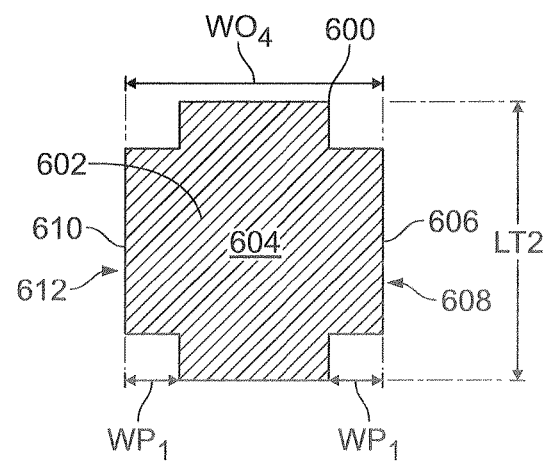
FIG. 9 is a cross-sectional view of another alternative outer link tooth disclosed herein.

FIG. 9 is a cross-sectional view of another example outer link tooth 600, which may be used to implement one or more of the outer link teeth 340 of FIGS. 3 and 5. The cross-sectional view of FIG. 9 is taken from line 7-7 of FIG. 5, which is on a plane tangent to the pitch circle 344 of the chainring 302 and extending through a center 602 of the outer link tooth 600. The outer link tooth 600 has the second longitudinal length LT2. In the illustrated embodiment, the second longitudinal length LT2 of the outer link tooth 600 is substantially the same as the first longitudinal length LT1 of the inner link tooth 342 of FIG. 6. In other embodiments, the second longitudinal length LT2 of the outer link tooth 600 is different than the first longitudinal length LT1 of the inner link tooth 342.

The outer link tooth 600 of FIG. 9 has a body 604 and an outboard protrusion 606 extending from an outboard side 608 of body 604. The body 604 of the outer link tooth 600 of FIG. 9 also has an inboard protrusion 610 extending from an inboard side 612 of the body 604. The outboard protrusion 606 and the inboard protrusion 610 facilitate engagement between the outer link tooth 600 and the chain 304. In the illustrated embodiment, the outer link tooth 600 of FIG. 9 has a fourth tooth width WO4 greater than the first tooth width WO1. In some embodiments, the fourth tooth width WO4 is greater than the second tooth width WO2. In other embodiments, the fourth tooth width WO4 is greater than the third tooth WO3. In the illustrated embodiment, the outboard protrusion 606 has the first protrusion width WP1, and the inboard protrusion 610 has a first protrusion width WP1.

As a result, the outer link tooth 600 may fill or occupy over about 75% of the first width W1 of one of the outer link spaces 336 when the outer link tooth 600 is fully received in the outer link space 336. In some embodiments, the outer link tooth 600 may fill or occupy over other amounts (e.g., more than 80%, more than 85%, etc.) of the first width W1 of one of the outer link spaces 336 when the outer link tooth 600 is fully received in the outer link space 336.

Figure 10:
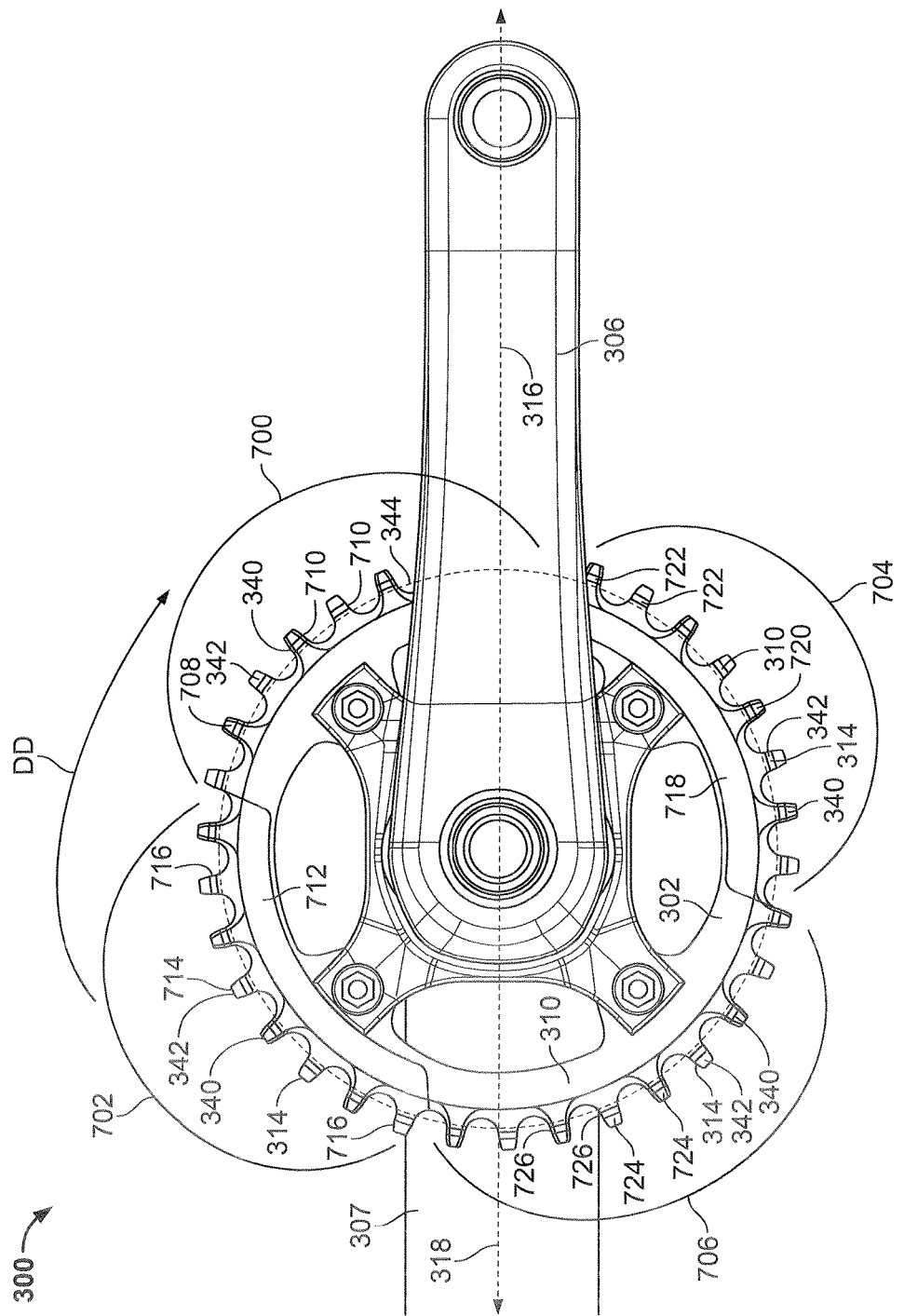
FIG. 10 is an outboard side elevational view of the crank assembly of FIG. 3.

FIG. 10 depicts the crank assembly 300 in the second or horizontal position. Thus, the longitudinal axis 316 of the first crank arm 306 of FIG. 3 is horizontal from the perspective of FIG. 10. In the illustrated embodiment, the chainring 302 includes a first section 700, a second section 702, a third section 704, and a fourth section 706. In the illustrated embodiment, the first section 700 and the fourth section 706 are unitary and/or integrally formed with the body 310 of the chainring 302. For example, the first section 700, the fourth section 706, and the body 310 may be stamped from a single piece of aluminum alloy. In the illustrated embodiment, the first section 700 includes a predetermined number of the teeth 314. For example, the first section 700 of FIG. 10 includes nine of the teeth 314. In other embodiments, the first section 700 includes other numbers of the teeth 314 (e.g., 1, 2, 3, 4, 5, 6, 7, 8, 10, 11, etc.). The teeth 314 of the first section 700 are referred to herein as first teeth 708.

The first teeth 708 are disposed consecutively on the first section 700. Thus, the first teeth 708 are the outer link teeth 340 and the inner link teeth 342 alternating with the outer link teeth 340. Therefore, consecutive teeth of the first teeth 708 have different thicknesses. For example, a first one of the first teeth 708 may be an inner link tooth 342 having a first tooth width WO1, and a second one of the first teeth 708 disposed consecutively with the first one of the first teeth 708 may have the fourth tooth width WO4 greater than the first tooth width WO1.

In the illustrated embodiment, the first teeth 708 and, particularly, a first load flank surface 710 of each of the first teeth 708 have a first wear resistance. As used in this disclosure, a load flank surface is a surface of a tooth (e.g., one of the teeth 314) that contacts a roller (e.g., the rollers 330) of a chain and applies force to the chain to drive the chain. In some embodiments, the first load flank surfaces 710 of the first teeth 708 have a first smoothness, a first hardness, a wear resistant coating, and/or one or more additional and/or alternative characteristics enabling the first teeth 708 to have the first wear resistance. In the illustrated embodiment, the first teeth 708, including the first load flank surfaces 710, are heat treated, wrought aluminum alloy. In other embodiments, the first teeth 708 and/or the first load flank surfaces 710 are other materials.

The second section 702 is coupled to the body 310 of the chainring 302. In the illustrated embodiment, the second section 702 includes a first bracket 712 permanently coupled to the body 310 of the chainring 302. For example, a weld, a braze weld, bonding, and/or one or more additional and/or alternative fasteners may permanently couple the first bracket 712 to the body 310. As used in this patent, "permanently coupled" means coupled in a manner that is intentionally difficult to decouple and/or intentionally cannot be decoupled without damaging or breaking one or more components. In other embodiments, the first bracket 712 is removably coupled to the body 310 of the chainring 302. For example, one or bolts and/or one or more additional and/or alternative fasteners may removably couple the first bracket 712 to the body 310 of the chainring 302. As used in this disclosure, "removably coupled" means coupled in a manner that is intentionally decoupleable.

The second section 702 includes a predetermined number of the teeth 314. In the illustrated embodiment, the second section 702 includes eight of the teeth 314. In other embodiments, the second section 702 includes other numbers of the teeth 314 (e.g., 1, 2, 3, 4, 5, 6, 7, 9, 10, 11, etc.). In the illustrated embodiment, the second section 702 has a different number of the 314 teeth than the first section 700. In other embodiments, the second section 702 has the same number of the teeth 314 as the first section 700. The teeth 314 of the second section 702 are referred herein as second teeth 714. In the illustrated embodiment, the second teeth 714 are unitary and/or integrally formed with the first bracket 712. In other embodiments, the second teeth 714 are coupled to the first bracket 712.

The second teeth 714 are disposed consecutively on the second section 702. Thus, the second teeth 714 are the outer link teeth 340 and the inner link teeth 342 alternating with the outer link teeth 340. Therefore, consecutive teeth of the second teeth 714 have different thicknesses. For example, a first one of the second teeth 714 may be an inner link tooth 342 having a first tooth width WO1, and a second one of the second teeth 314 disposed consecutively with the first one of the second teeth 714 may have the fourth tooth width WO4 greater than the first tooth width WO1.

In the illustrated embodiment, the second teeth 714 and, particularly, a second load flank surface 716 of each of the second teeth 714 have a second wear resistance greater than the first wear resistance. In some embodiments, the second load flank surfaces 716 of the second teeth 714 have a second smoothness smoother than the first smoothness, a second hardness harder than the first hardness, a wear resistant coating, and/or one or more additional and/or alternative characteristics enabling the second teeth 714 to have the second wear resistance. In the illustrated embodiment, the second teeth 714, including the second load flank surfaces 716, are high carbon, alloyed steel. In some embodiments, the second teeth 714, including the second load flank surfaces 716, are titanium alloy. In other embodiments, the second teeth 714 and/or the second load flank surfaces 716 are other materials. The second teeth may be four times more wear resistant than the first teeth.

The third section 704 is also permanently coupled to the body 310 of the chainring 302. In the illustrated embodiment, the third section 704 includes a second bracket 718 permanently coupled to the body 310 of the chainring 302. For example, a weld, a braze weld, bonding, and/or one or more additional and/or alternative fasteners may permanently couple the second bracket 718 to the body 310. In other embodiments, the second bracket 718 is removably coupled to the body 310 of the chainring 302. For example, one or bolts and/or one or more additional and/or alternative fasteners may removably couple the second bracket 718 to the body 310 of the chainring 302.

The third section 704 includes a predetermined number of the teeth 314. In the illustrated embodiment, the third section 704 includes eight of the teeth 314. Thus, in the illustrated embodiment, the second section 702 and the third section 704 have the same number of teeth. In other embodiments, the third section 704 includes other numbers of the teeth 314 (e.g., 1, 2, 3, 4, 5, 6, 7, 9, 10, 11, etc.). In some embodiments, the third section 704 has a different number of the teeth 314 than the second section 702. The teeth 314 of the third section 704 are referred to herein as third teeth 720. In the illustrated embodiment, the third teeth 720 are unitary and/or integrally formed with the second bracket 718. In other embodiments, the third teeth 720 are coupled to the second bracket 718.

The third teeth 720 are disposed consecutively on the third section 704. Thus, the third teeth 720 are the outer link teeth 340 and the inner link teeth 342 alternating with the outer link teeth 340. Therefore, consecutive teeth of the third teeth 720 have different thicknesses. For example, a first one of the third teeth 720 may be an inner link tooth 342 having a first tooth width WO1, and a second one of the third teeth 720 disposed consecutively with the first one of the third teeth 720 may have the fourth tooth width WO4 greater than the first tooth width WO1.

In the illustrated embodiment, the third teeth 720 and, particularly, a third load flank surface 722 of each of the third teeth 720 have a third wear resistance greater than the first wear resistance. In some embodiments, the third wear resistance is greater than the second wear resistance. In other embodiments the third wear resistance is less than the second wear resistance. In still other embodiments, the third wear resistance is equal to the second wear resistance. In some embodiments, the third load flank surfaces 722 of the third teeth 720 have a third smoothness smoother than the first smoothness, a third hardness harder than the first hardness, a wear resistant coating, and/or one or more additional and/or alternative characteristics enabling the third teeth 720 to have the third wear resistance. In the illustrated embodiment, the third teeth 720, including the third load flank surfaces 722, are high carbon, alloyed steel. In some embodiments, the third teeth 720, including the third load flank surfaces 722, are titanium alloy. In other embodiments, the third teeth 720 and/or the third load flank surfaces 722 are other materials.

In the illustrated embodiment, the fourth section 706 includes a predetermined number of the teeth 314. For example, the fourth section 706 of FIG. 10 includes nine of the teeth 314. In other embodiments, the fourth section 706 includes other numbers of the teeth 314 (e.g., 1, 2, 3, 4, 5, 6, 7, 8, 10, 11, etc.). The teeth 314 of the fourth section 706 are referred to herein as fourth teeth 724.

The fourth teeth 724 are disposed consecutively on the fourth section 706. Thus, the fourth teeth 724 are the outer link teeth 340 and the inner link teeth 342 alternating with the outer link teeth 340. Therefore, consecutive teeth of the fourth teeth 724 have different thicknesses. For example, a first one of the fourth teeth 724 may be an inner link tooth 342 having a first tooth width WO1, and a second one of the fourth teeth 724 disposed consecutively with the first one of the fourth teeth 724 may have the fourth tooth width WO4 greater than the first tooth width WO1.

In the illustrated embodiment, the fourth teeth 724 and, particularly, a fourth load flank surface 726 of each of the fourth teeth 724 have the first wear resistance. In some embodiments, the fourth load flank surfaces 726 of the fourth teeth 724 have the first smoothness, the first hardness, and/or one or more additional and/or alternative characteristics enabling the fourth teeth 724 to have the first wear resistance. In the illustrated embodiment, the fourth teeth 724, including the fourth load flank surfaces 726, are heat treated, wrought aluminum alloy. In other embodiments, the fourth teeth 724 are other materials.

Figure 11:
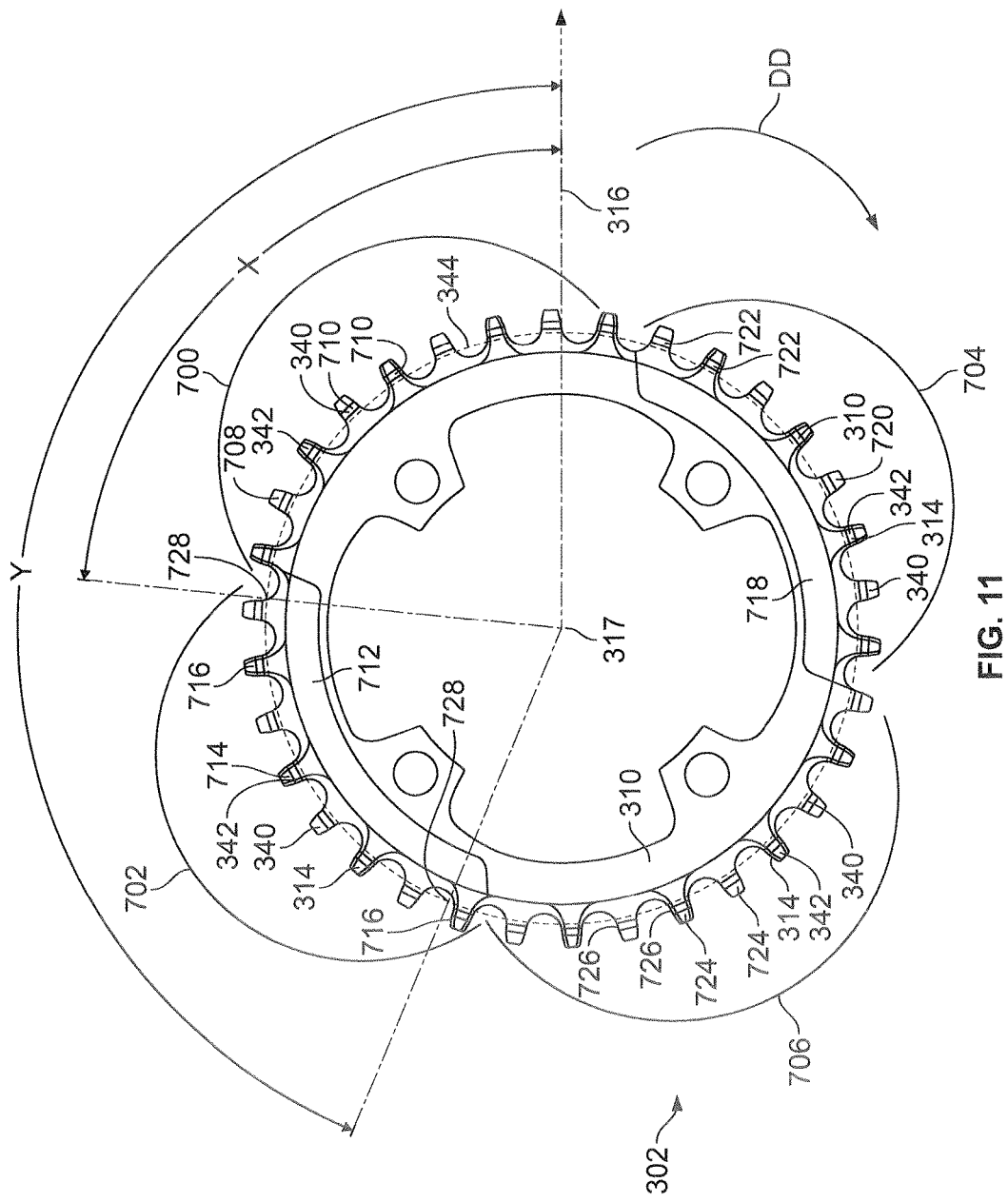
FIG. 11 is an outboard side view of the chainring of FIG. 10.

FIG. 11 is a front view of the chainring 302 of FIG. 3 decoupled from the carrier 308 and the first crank arm 306. However, the longitudinal axis 316 of the first crank arm 306 is shown in FIG. 11. As discussed above with reference to FIG. 2, the peak or maximum torque output during a pedaling cycle employing the crank assembly 300 of FIG. 3 occurs during a maximum torque portion of the pedaling cycle in which the longitudinal axis 316 of the first crank arm 306 is horizontal or nearly horizontal as the rider pedals the first crank arm 306. As a result, at least one of the teeth 314 which engage and advance the chain 304 during the maximum torque portion of the pedaling cycle apply a maximum force to the chain 304 during the pedaling cycle.

In this disclosure, a tooth is disposed on a chainring "behind" a longitudinal axis of a crank arm by an angle measured in a direction opposite a driving direction from the longitudinal axis of the first crank arm 306, where the angle has a vertex at an intersection of the longitudinal axis of the crank arm and an axis of rotation (e.g., the axis of rotation 317 of FIG. 11) of the chainring 302. In this disclosure, a tooth is disposed on a chainring "in front of" a longitudinal axis of a crank arm by an angle measured in the driving direction from the longitudinal axis of the crank arm, where the angle has a vertex at the intersection of the longitudinal axis of the crank arm and the axis of rotation of the chainring.

As referred to in the present disclosure, a tooth that is behind a longitudinal axis of a crank arm relative to the driving direction by between more than zero degrees and 180 degrees or less are referred to in this patent as "trailing" the longitudinal axis of the crank arm. A tooth that is behind the longitudinal axis of the crank arm relative to the driving direction by more than 180 degrees and less than 360 degrees is referred to in this patent as "leading" the longitudinal axis of the crank arm.

As discussed above with reference to FIG. 2, during a pedaling cycle of the crank assembly 300 of FIGS. 10 and 11, the first crank arm 306 moves from the first position 202 (FIG. 2A) to the third position 204 (FIG. 2C). As a result, during the pedaling cycle of the first crank arm 306, the first teeth 708 of the first section 700, the second teeth 714 of the second section 702, and the fourth teeth 724 of the fourth section 706 sequentially engage the chain 304. The second teeth 714 are positioned on the chainring 302 to engage the chain 304 and apply a maximum force to the chain 304 when the first crank arm 306 is in or near the third position 206 (FIG. 2B). Thus, in the illustrated embodiment, the second teeth 714 of the second section 702 of the chainring 302 are in positions on the chainring 302 relative to the first crank arm 306 to enable at least one of the second teeth 714 to engage the chain 304 and apply the maximum force to the chain 304 during the maximum torque portion of the pedaling cycle of the first crank arm 306. For example, in the embodiment of FIG. 11, the second teeth 714 are consecutively disposed on the chainring 302 between about an angle X and about an angle Y behind the longitudinal axis 316 of the first crank arm 306 relative to the driving direction DD. In the illustrated embodiment, angle X is about 85 degrees, and angle Y is about 155 degrees. In other embodiments, the second teeth 714 are disposed on the chainring 302 behind the longitudinal axis 316 of the first crank arm 306 relative to the driving direction DD by other numbers of degrees such as, for example, between more than 60 degrees and less than 180 degrees, between 30 degrees and 210 degrees, between 60 degrees and 90 degrees, and/or by other number of degrees. As mentioned above, the second teeth 714 are consecutively disposed on the chainring 302 between about 85 degrees and about 155 degrees behind the longitudinal axis 316 of the first crank arm 306 relative to the driving direction DD. Thus, the second teeth 714 span an arc length corresponding to about 7/36 of a circumference of the pitch circle 344 of the chainring 302 measured from the pitch point 728 of an initial one of the second teeth 714 to the pitch point 728 of a last one of the second teeth 714 relative to the driving direction DD. In other embodiments, the second teeth 714 span other arc lengths. For example, the second teeth 714 may span arc lengths corresponding to between one twelfth and one third of the circumference of the pitch circle 344 of the chainring 302.

Figure 12:
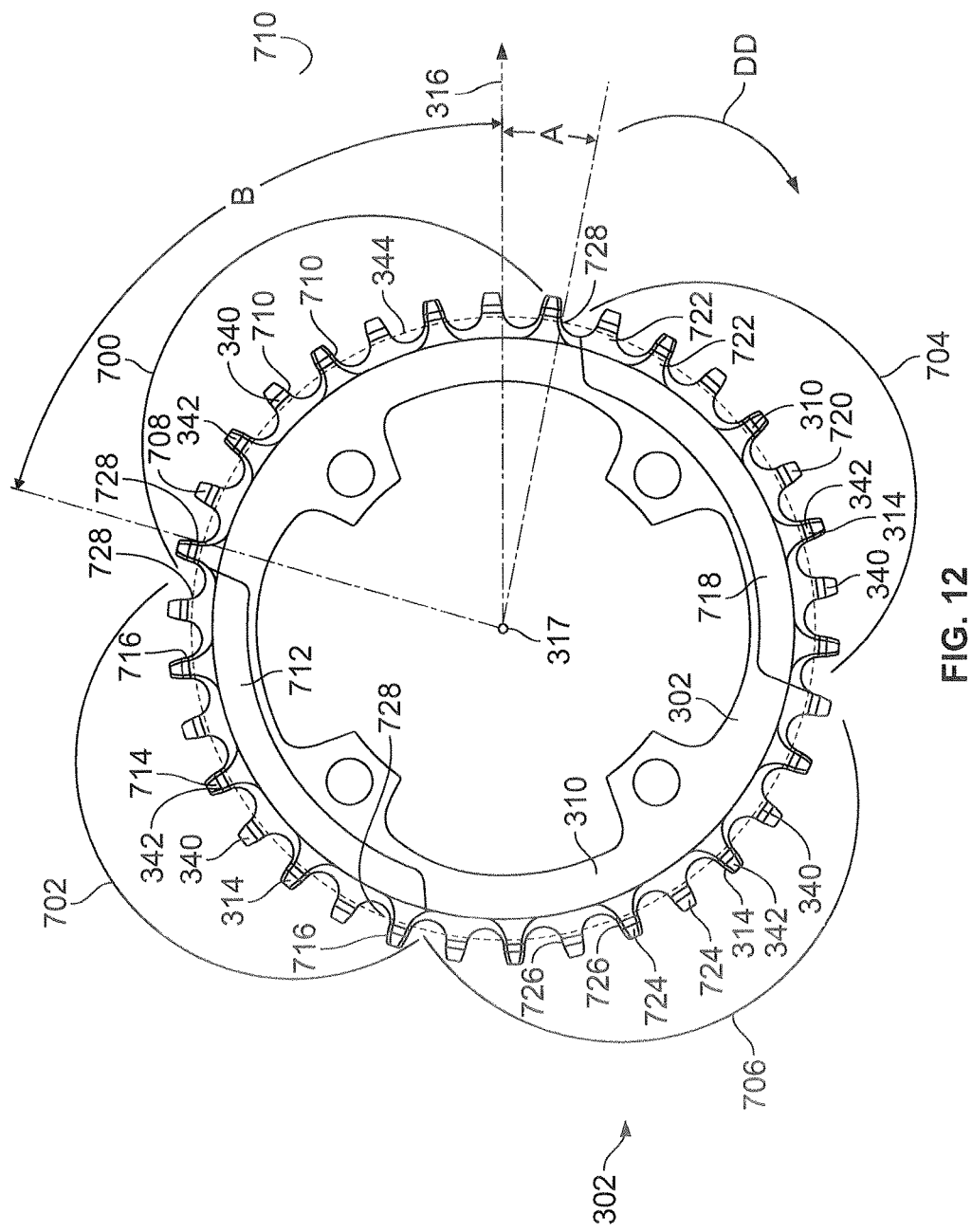
FIG. 12 is another outboard side view of the chainring of FIG. 10.

FIG. 12 is a similar view of the chainring 302 shown in FIG. 11. The first teeth 708 of FIG. 11 are in positions on the chainring 302 to enable the first teeth 708 to engage the chain 204 and apply a minimum force to the chain 304 when the first crank arm 306 is in or near the first position 202 (FIG. 2A). Thus, in the present embodiment, the first teeth 708 of the first section 700 are in positions on the chainring 302 relative to the first crank arm 306 to enable at least one of the first teeth 708 to engage the chain 304 and apply a minimum force to the chain 304 during the initial minimum torque portion of the pedaling cycle of the first crank arm 306. For example, the first teeth 708 are consecutively disposed on the chainring 302 between about an angle A in front of the longitudinal axis 316 and about an angle B behind the longitudinal axis 316 of the first crank arm 306 relative to the driving direction DD. In the illustrated embodiment, angle A is about 12 degrees and angle B is about 73 degrees. In other embodiments, the first teeth 708 are in other positions relative to the first crank arm 306. Thus, the first teeth 708 span an arc length corresponding to about 3/14 of the circumference of the pitch circle 344 of the chainring 302 measured from the pitch point 728 of an initial one of the first teeth 710 to the pitch point 728 of a last one of the first teeth 708 relative to the driving direction DD. In other embodiments, the first teeth 710 span other arc lengths.

In the embodiment of FIG. 12, the fourth section 706 is a mirror image of the first section 700 and is diametrically opposed to the first section 700. As a result, the fourth teeth 724 are in positions on the chainring 302 to enable the fourth teeth 724 to apply the minimum force as the first crank arm 306 moves past the third or horizontal position 206 (FIG. 2B) and into the second position 204 (FIG. 2C). Thus, in the illustrated embodiment, the fourth teeth 724 of the fourth section 706 are in positions on the chainring 302 relative to the first crank arm 306 to enable at least one of the fourth teeth 724 to engage the chain 304 and apply the minimum force to the chain 304 during the subsequent minimum torque portion of the pedaling cycle of the first crank arm 306.

During a pedaling cycle of the second crank arm 307 of the crank assembly 300, the second crank arm 307 moves from the first position 202 (FIG. 2A) to the third position 204 (FIG. 2C). As a result, during the pedaling cycle, the fourth teeth 724 of the fourth section 706, the third teeth 720 of the third section 704, and the first teeth 708 of the first section 700 sequentially engage the chain 304. In the illustrated embodiment, the third section 704 is a mirror image of the second section 702, the first section 700 is a mirror image of the fourth section 706, and the second crank arm 307 is a mirror image of the first crank arm 306. Further, the third section 704 is diametrically opposed to the second section 702. Therefore, the description above of the positions of the second teeth 714 relative to the first crank arm 306 are applicable to positions of the third teeth 720 relative to the second crank arm 307. As a result, during the pedaling cycle of the second crank arm 307, the fourth teeth 724 engage the chain 304 and apply a minimum force to the chain 304 during the initial minimum torque portion of the pedaling cycle of the second crank arm 307; the third teeth 720 engage the chain 304 and apply the maximum force to the chain 304 during the maximum torque portion of the pedaling cycle of the second crank arm 307; and the first teeth engage the chain 304 and apply a minimum force to the chain 304 during the subsequent minimum torque portion of the pedaling cycle of the second crank arm 307.

Figure 13:
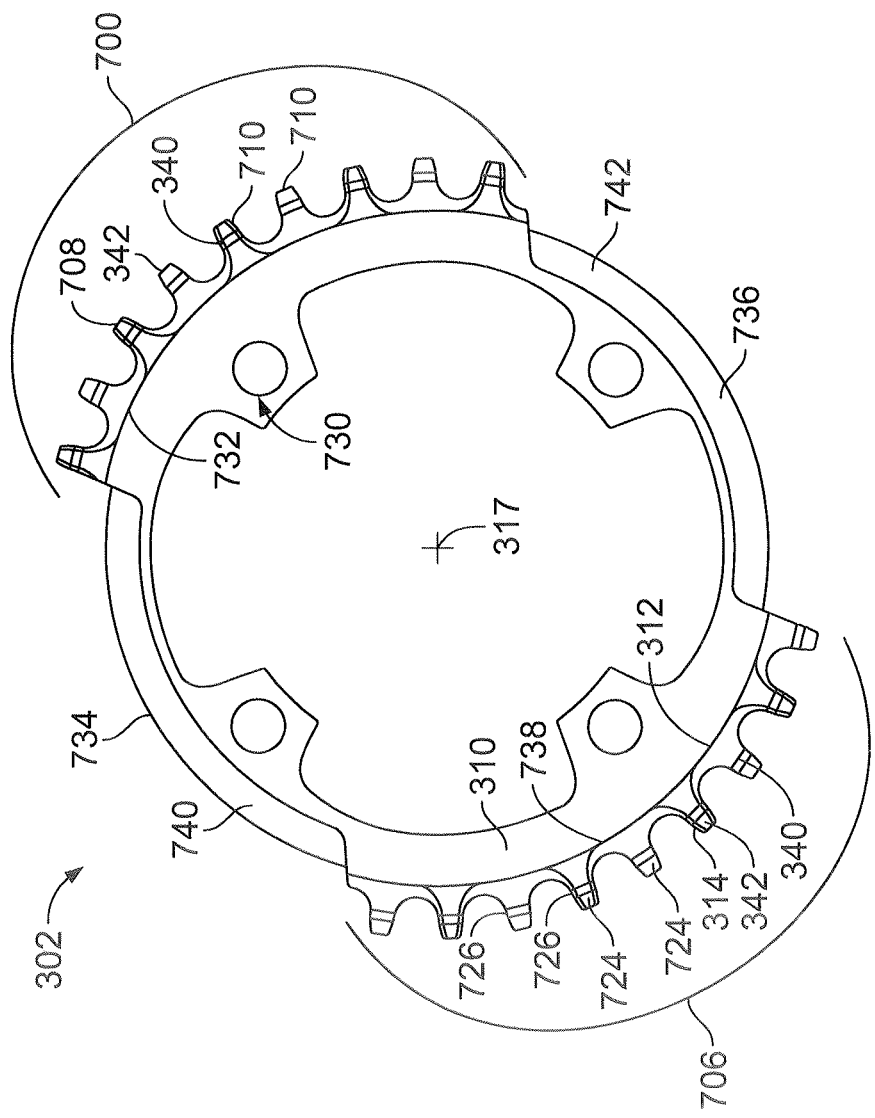
FIG. 13 is another outboard side view of the chainring of FIG. 10 having two sections of the chainring decoupled from a body of the chainring.

Turning to FIG. 13, an outboard side 730 of the chainring 302 is depicted with the second section 702 and the third section 704 decoupled from the body 310. In the illustrated embodiment, the periphery 312 of the body 310 of the chainring 302 has a first peripheral portion 732, a second peripheral portion 734, a third peripheral portion 736, and a fourth peripheral portion 738. The first peripheral portion 732 is integrally formed and/or unitary with the first teeth 710, and the fourth peripheral portion 738 is integrally formed and/or unitary with the fourth teeth 724.

The second peripheral portion 734 of FIG. 12 has no teeth. In the illustrated embodiment, the second peripheral portion 734 includes a first seating area 740 on the outboard side 730 of the chainring 302 to receive the first bracket 712 (see FIG. 10). With reference to the embodiment of FIG. 12, the first seating area 740 is a recess having a size and a shape corresponding to a size and shape of the first bracket 712. The third peripheral portion 736 also has no teeth. In the illustrated embodiment, the third peripheral portion 736 includes a second seating area 742 to receive the second bracket 718 (see FIG. 10). In the illustrated embodiment, the second seating area 742 is a recess having a size and a shape corresponding to a size and shape of the second bracket 718. In other embodiments, the first seating area 740 and/or the second seating area 742 are implemented in other ways.

Figure 14:
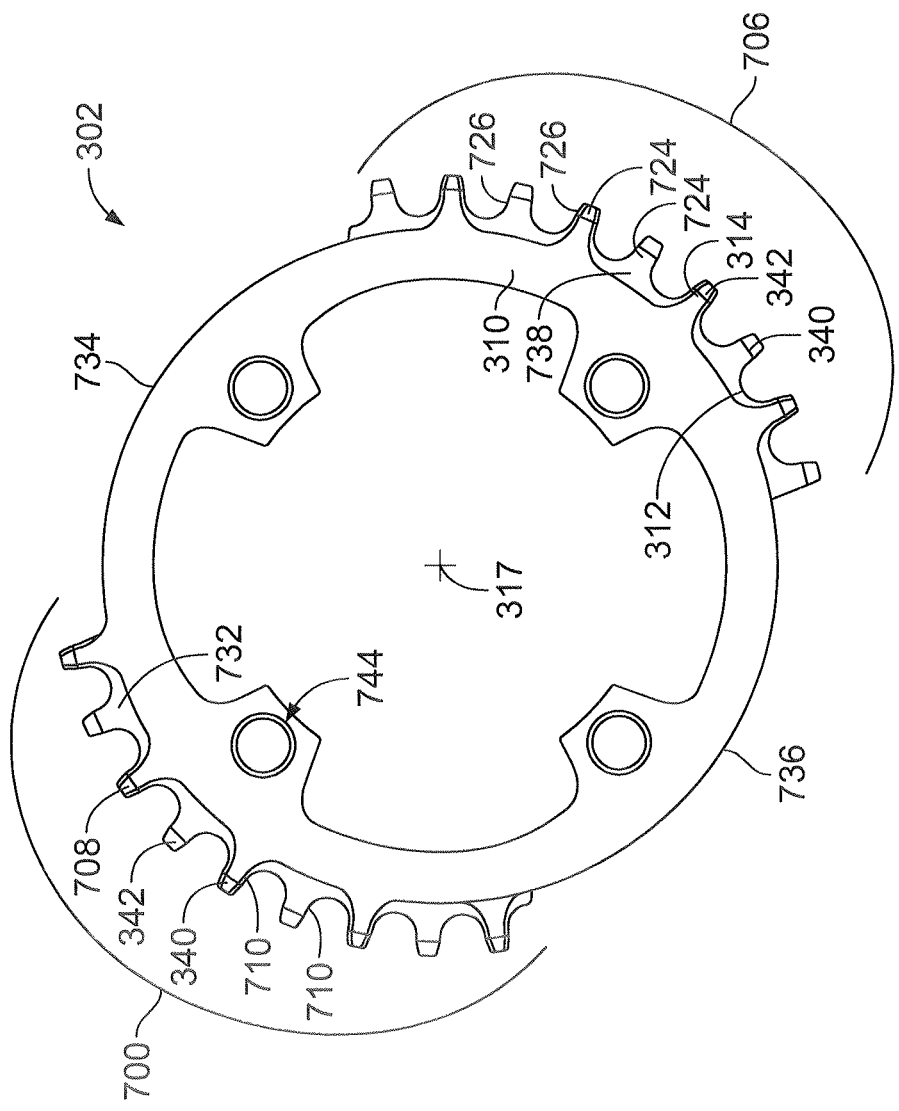
FIG. 14 is an inboard side view of one of the chainring of FIG. 13.
Figure 15:
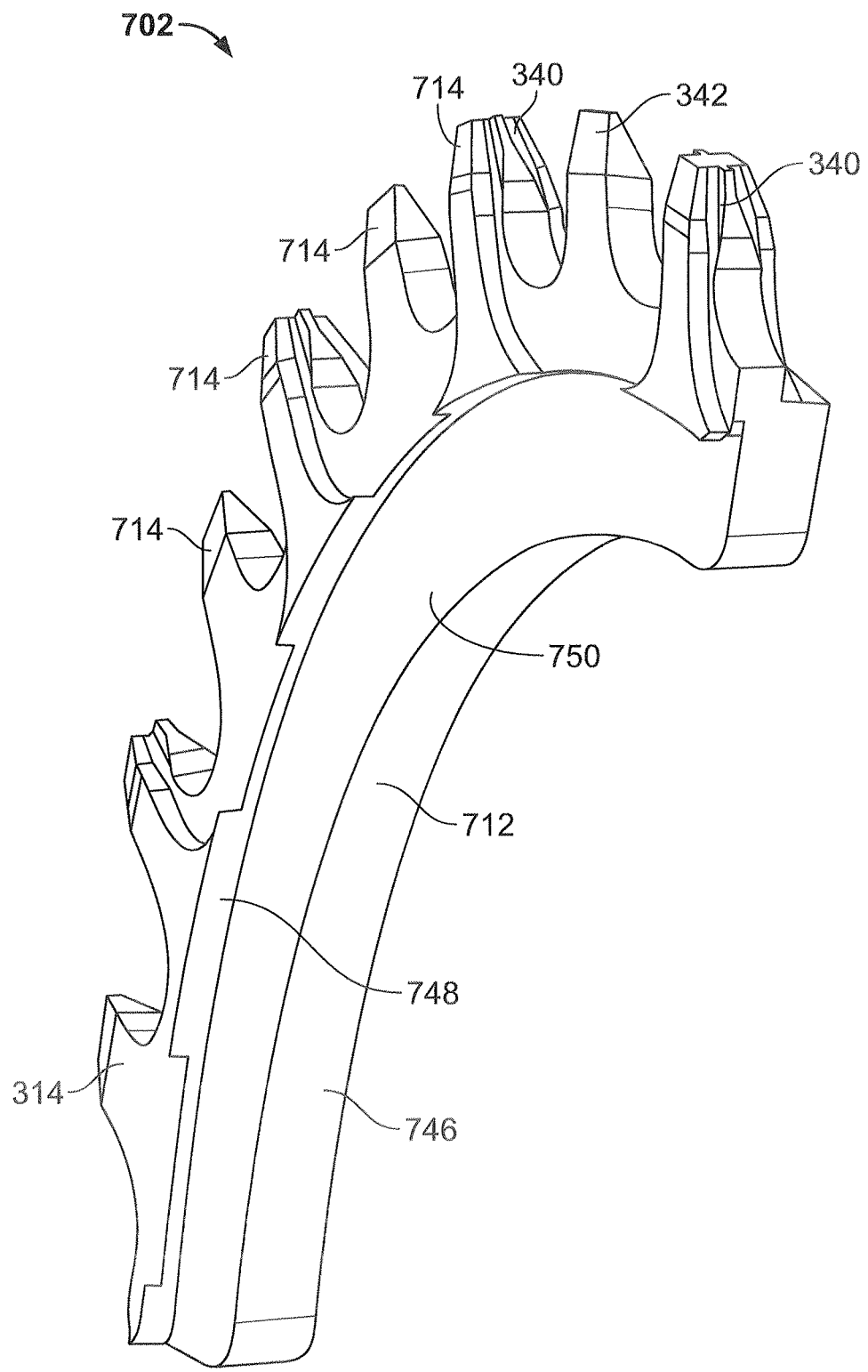
FIG. 15 is an inboard side, perspective view of one of the sections decoupled from the chainring of FIG. 13.

FIG. 14 illustrates an inboard side 744 of the chainring 302 with the second section 702 and the third section 704 decoupled from the body 310. In the illustrated embodiment, on the inboard side 744 of the chainring 302, the second peripheral portion 734 and the third peripheral portion 736 do not include seating areas for the first bracket 712 and the second bracket 718, respectively. In other embodiments, the second peripheral portion 734 and/or the third peripheral portion 736 include seating areas (e.g., recesses) to receive portions of the first bracket 712 and/or the second bracket 718, respectively, FIG. 15 is a perspective view of one embodiment of the second section 702 of the chainring 302. In the illustrated embodiment, the first bracket 712 includes an arc-shaped flange 746. When the second section 702 is coupled to the body 310 of the chainring 302, the flange 746 is received in the first seating area 740 of the second peripheral portion 734 of the body 310. Portions of the second teeth 714 extend or project from the flange 746 to form an overhanging base 748. When the second section 702 is coupled to the body 310, the base 748 rests on and/or is supported by the periphery 312 of the body 310, and an inboard facing side 750 of the flange 746 abuts the first seating area 740. In the present embodiment of the chainring 302, the third section 704 is substantially similar or identical to the second section 702 of FIG. 15. Therefore, the above description of the second section 702 is applicable to the third section 704. Therefore, to avoid redundancy, the third section 704 of the chainring 302 is not separately described herein.

Figure 16:
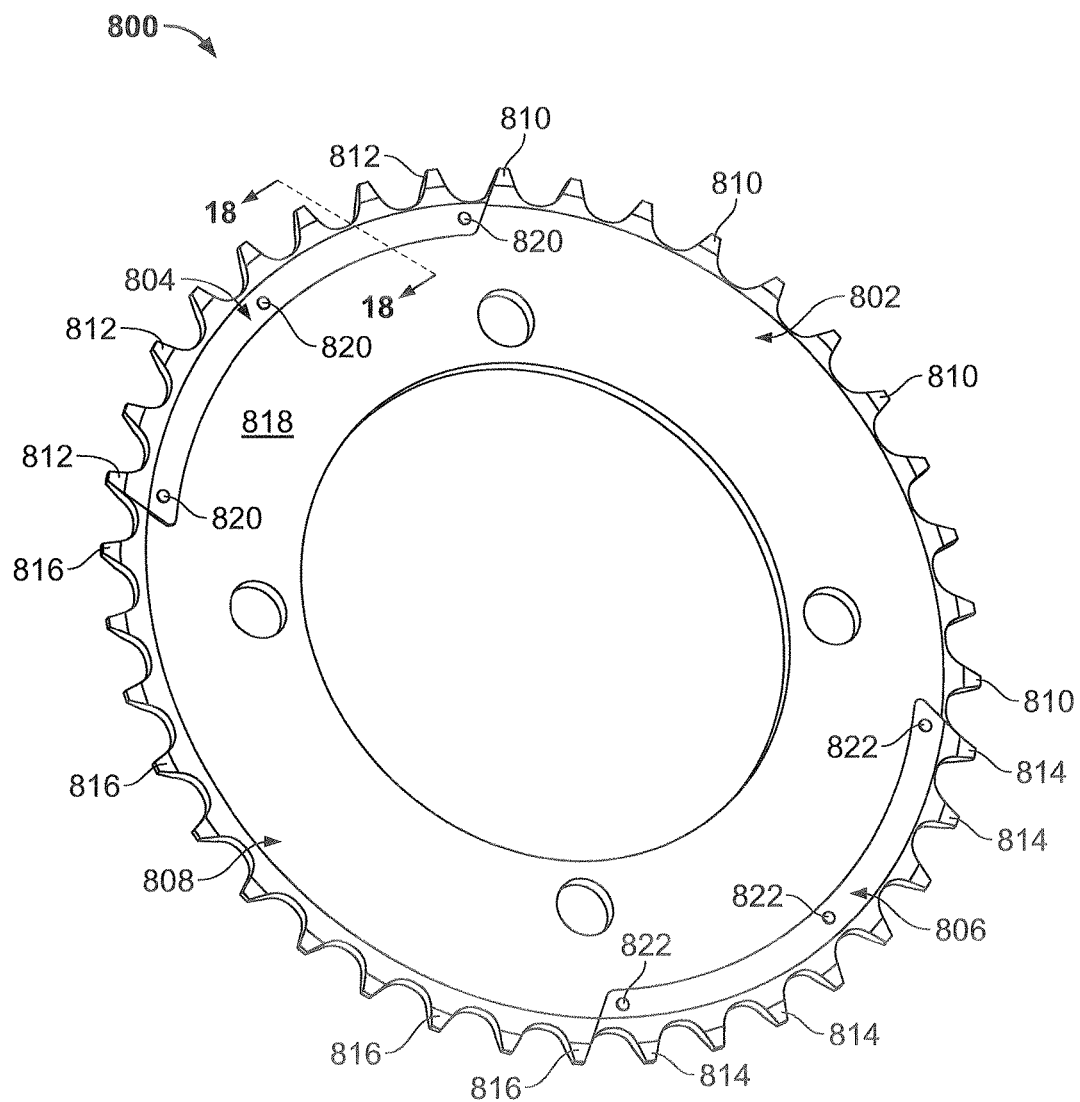
FIG. 16 is an outboard side, perspective view of another embodiment of a chainring, which may be employed to implement any of the crank assemblies disclosed herein.

FIG. 16 is another embodiment of a chainring 800 disclosed herein, which may be used to implement the crank assembly 112 of FIG. 1 and/or the crank assembly 300 of FIG. 3. In the illustrated embodiment, the chainring 800 includes a first section 802, a second section 804, a third section 806, and a fourth section 808. In the illustrated embodiment, the first section 802 is a mirror image of the fourth section 808, and the first section 802 is diametrically opposed to the fourth section 808. The third section 806 is a mirror image of the second section 804, and the third section 806 is diametrically opposed to the second section 804.

In the illustrated embodiment, the first section 802 has consecutive first teeth 810 having a first wear resistance. The second section 804 has consecutive second teeth 812 having a second wear resistance greater than the first wear resistance. The third section 806 has consecutive third teeth 814 having a third wear resistance. In some embodiments, the third wear resistance is substantially equal to the second wear resistance. In some embodiments, the third wear resistance is less than or greater than the second wear resistance. The fourth section 808 has consecutive fourth teeth 816 having the first wear resistance.

In the illustrated embodiment, the first teeth 810, the second teeth 812, the third teeth 814, and the fourth teeth 816 have substantially the same size and shape. For example, the first teeth 810, the second teeth 812, the third teeth 814, and the fourth teeth 816 have substantially the same thickness. In the illustrated embodiment, the first section 802 and the fourth section 808 are integrally formed and/or unitary with a body 818 of the chainring 800. The second section 804 is coupled to the body 818 via three first fasteners 820. The third section 806 is also coupled to the body 818 via three second fasteners 822. In other embodiments, the second section 804 and/or the third section 806 are coupled to the body 818 via other numbers of fasteners (e.g., 1, 2, 4, 5, etc.).

When a crank arm (e.g., the crank arm 124 of FIG. 1, the first crank arm 306 of FIG. 3, and/or the second crank arm 307 of FIG. 3) is coupled to the chainring 800 of FIG. 16, the second teeth 812 of the second section 804 and/or the third teeth 814 of the third section 806 are in positions on the chainring 800 relative to the crank arm to enable at least one of the second teeth 812 and/or the third teeth 814 to engage a chain (e.g., the chain 304) and apply a maximum force to the chain during the maximum torque portion of the pedaling cycle of the chainring 800. The first teeth 810 of the first section 802 are in positions on the chainring 302 relative to the crank arm to enable at least one of the first teeth 810 to engage the chain and apply a minimum force to the chain 304 during one of the initial minimum torque portion the pedaling cycle of the chainring 800. The fourth teeth 816 of the fourth section 808 are in positions on the chainring 800 relative to the crank arm to enable at least one of the fourth teeth 816 to engage the chain and apply the minimum force to the chain during the subsequent minimum torque portion of the pedaling cycle of the chainring 800.

Figure 17:
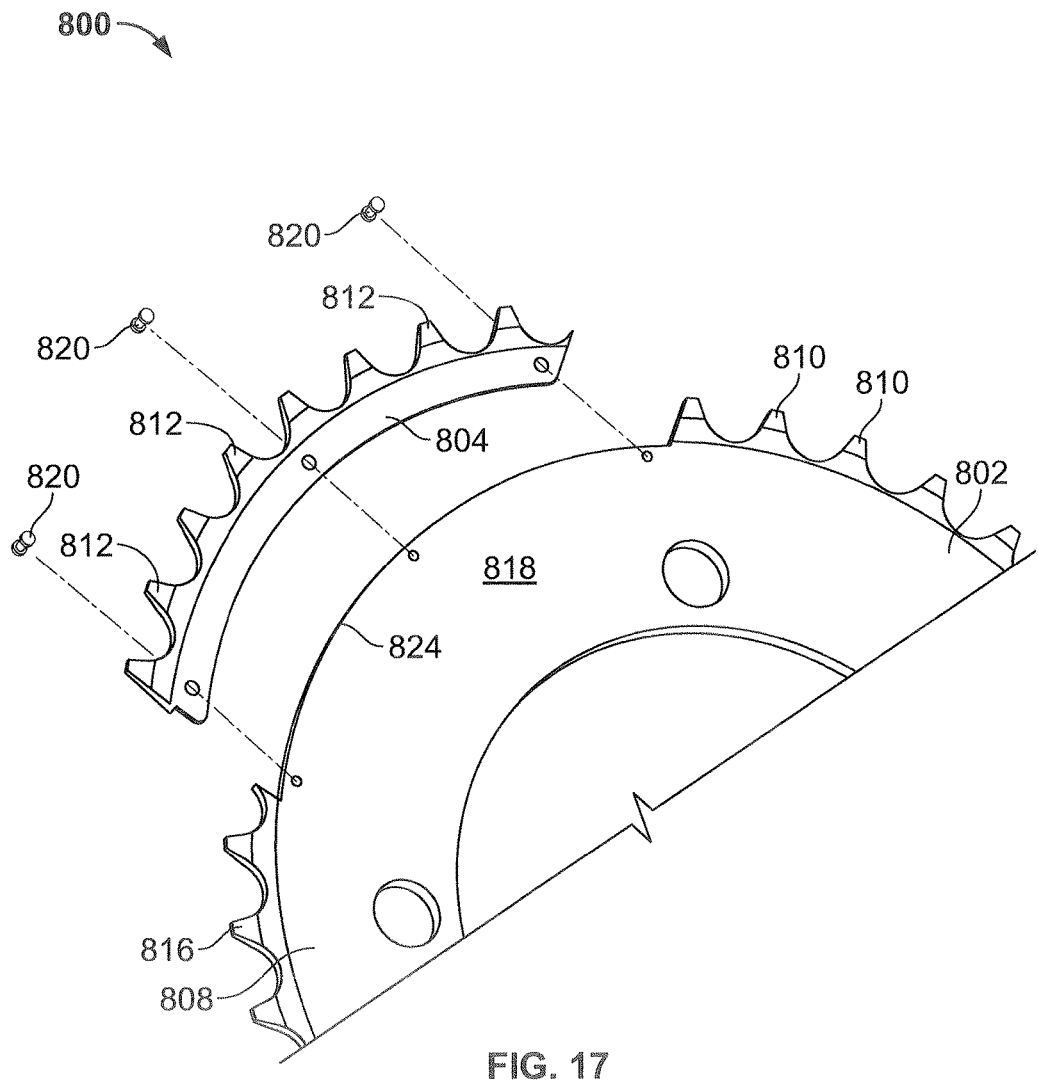
FIG. 17 is an outboard side, exploded partial perspective view of the chainring of FIG. 16.

FIG. 17 is an exploded view of the chainring 800 of FIG. 8. In the illustrated embodiment, the body 818 of the chainring 800 includes a peripheral potion 824 having no teeth. The peripheral portion 824 of the chainring 800 supports the second section 804. In the illustrated embodiment, the peripheral portion 824 does not include a recess to receive the second section 804.

Figure 18:
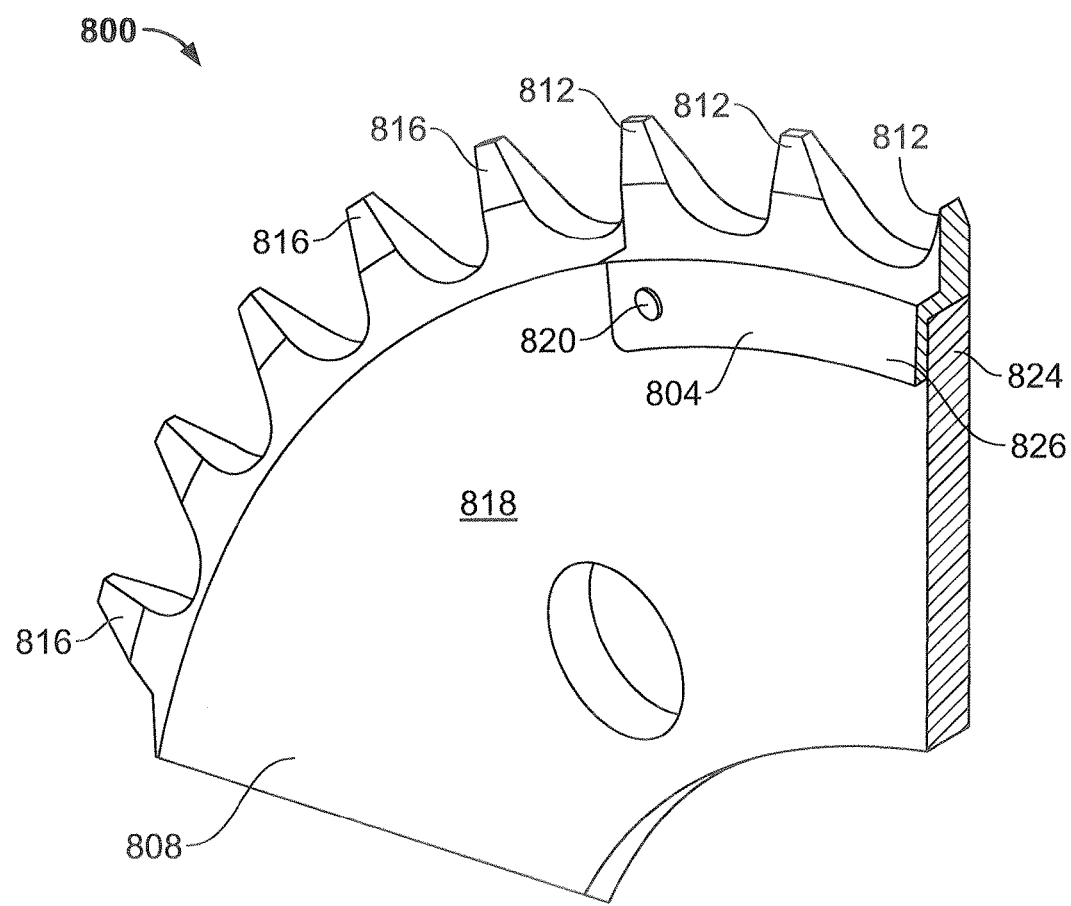
FIG. 18 is cross-sectional, partial perspective view of the chainring taken along line 18-18 of FIG. 16.

FIG. 18 is a cross-sectional view of the body 818 and the second section 804 along line 17-17 of FIG. 16. FIG. 18 illustrates the second section 804 supported on the peripheral portion 824 of the body 818. In the illustrated embodiment, the second section 804 includes an L-shaped bracket 826 that is supported on the peripheral portion 826. In other embodiments, the bracket 826 is other shapes. For example, the bracket 826 may be U-shaped.

Figure 19:
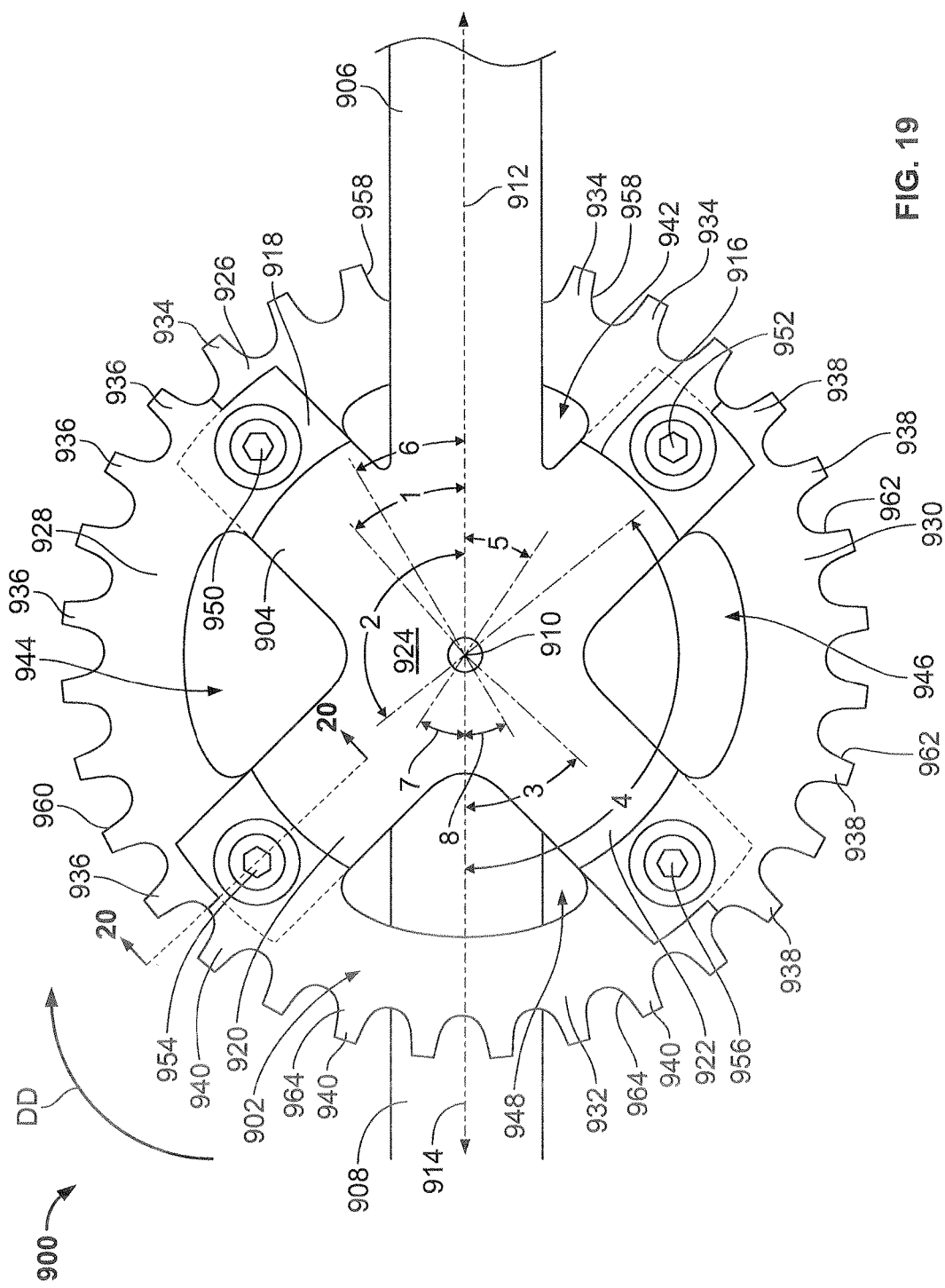
FIG. 19 is an outboard side elevational view of yet another embodiment of a crank assembly.

FIG. 19 shows another embodiment of a crank assembly 900. In the illustrated embodiment, the crank assembly 900 includes a chainring 902, a carrier 904, a first crank arm 906, and a second crank arm 908. The first crank arm 906, the second crank arm 908, and the chainring 902 rotate about an axis of rotation 910 during a pedaling cycle of the crank assembly 900. The axis of rotation 910 extends into the page from the perspective of FIG. 19. The first crank arm 906 includes a first longitudinal axis 912 that intersects the axis of rotation 910. The second crank arm 906 includes a second longitudinal axis 914 that is parallel to the first longitudinal axis 912 and intersects the axis of rotation 910.

In the illustrated embodiment, the carrier 904 includes a first arm 916, a second arm 918, a third arm 920, and a fourth arm 922. In other embodiments, the carrier 904 includes other numbers of arms (e.g., 1, 2, 3, 5, 6, etc.). In the illustrated embodiment, the first arm 916, the second arm 918, the third arm 920, and the fourth arm 922 extend radially from a hub 924 of the carrier 904. The first crank arm 906 and the second crank arm 908 are non-rotatably coupled to the hub 924 of the carrier 904.

The chainring 902 includes a first section or bridge 926, a second section or bridge 928, a third section or bridge 930, and a fourth section or bridge 932. In the illustrated embodiment, the first bridge 926 includes consecutive first teeth 934, the second bridge 928 includes consecutive second teeth 936, the third bridge 928 includes consecutive third teeth 938, and the fourth bridge 930 includes consecutive fourth teeth 940. In some embodiments, the first teeth 934, the second teeth 936, the third teeth 938, and/or the fourth teeth 940 are alternating outer link teeth and inner link teeth, which may have shapes and/or sizes similar or identical to those described herein, e.g., the outer link teeth 340 of FIG. 5, the outer link teeth 400 of FIG. 7, the outer link teeth 500 of FIG. 8, the outer link teeth 600 of FIG. 9, and/or the inner link teeth 342 of FIGS. 5 and 6.

In the illustrated embodiment, the first bridge 926 extends across a first space 942 between the first arm 916 of the carrier 904 and the second arm 918 of the carrier 904. The second bridge 928 extends across or bridges a second space 944 between the second arm 918 and the third arm 920. The third bridge 930 bridges a third space 946 between the first arm 916 and the fourth arm 922. The fourth bridge 932 extends across a fourth space 948 between the third arm 920 and the fourth arm 922.

A first fastener 950 removably couples the first bridge 926 and the second bridge 928 to the second arm 918 of the carrier 904. A second fastener 952 removably couples the first bridge 926 and the third bridge 930 to the first arm 916 of the carrier 904. A third fastener 954 removably couples the second bridge 928 and the fourth bridge 932 to the third arm 920 of the carrier 904. A fourth fastener 956 removably couples the third bridge 930 and the fourth bridge 932 to the fourth arm 922 of the carrier 904. Thus, each of the bridges 926, 928, 930, 932 may be individually decoupled from the crank assembly 900. As a result, unlike traditional chainrings which must be replaced in their entirety when merely a few teeth reach an end of their useful life, the example chainring 902 of FIG. 19 enables selected ones of the bridges 926, 928, 930, 932 to be replaced.

In the illustrated embodiment, the first teeth 934 and, particularly, a first load flank surface 958 of each of the first teeth 934 have a first wear resistance. In some embodiments, the first load flank surfaces 958 of the first teeth 934 have a first smoothness, a first hardness, and/or one or more additional and/or alternative characteristics enabling the first teeth 934 to have the first wear resistance. In the illustrated embodiment, the first bridge 926, including the first teeth 934, are heat treated, wrought aluminum alloy. In other embodiments, the first bridge 926 and/or the first teeth 934 are other materials.

In the illustrated embodiment, the second teeth 936 and, particularly, a second load flank surface 960 of each of the second teeth 936 have a second wear resistance greater than the first wear resistance. In some embodiments, the second load flank surfaces 960 of the second teeth 936 have a second smoothness smoother than the first smoothness, a second hardness harder than the first hardness, a wear resistant coating, and/or one or more additional and/or alternative characteristics enabling the second teeth 936 to have the second wear resistance. In the illustrated embodiment, the second bridge 928, including the second teeth 936, is high carbon, alloyed steel. In some embodiments, the second bridge 928, including the second teeth 936, is titanium alloy. In other embodiments, the second bridge 928 and/or the second teeth 936 are other materials.

In the illustrated embodiment, the third teeth 938 and, particularly, a third load flank surface 962 of each of the third teeth 938 have a third wear resistance greater than the first wear resistance. In some embodiments, the third wear resistance is greater than the second wear resistance. In other embodiments, the third wear resistance is less than the second wear resistance. In still other embodiments, the third wear resistance is equal to the second wear resistance. In some embodiments, the third load flank surfaces 962 of the third teeth 938 have a third smoothness smoother than the first smoothness, a third hardness harder than the first hardness, a wear resistant coating, and/or one or more additional and/or alternative characteristics enabling the third teeth 938 to have the third wear resistance. In the illustrated embodiment, the third bridge 930, including the third teeth 938, is high carbon, alloyed steel. In some embodiments, the third teeth 938, including the third load flank surfaces 962, are titanium alloy. In other embodiments, the third bridge 930 and/or the third teeth 938 are other materials.

In the illustrated embodiment, the fourth teeth 940 and, particularly, a fourth load flank surface 964 of each of the fourth teeth 940 have a fourth wear resistance. In some embodiments, the fourth load flank surfaces 964 of the fourth teeth 940 have the a fourth smoothness, a fourth hardness, and/or one or more additional and/or alternative characteristics enabling the fourth teeth 940 to have the fourth wear resistance. In some embodiments, the fourth wear resistance is equal to the first wear resistance. In other embodiments, the fourth wear resistance is greater than or less than the first wear resistance. In the illustrated embodiment, fourth bridge 932, including the fourth teeth 740 are heat treated, wrought aluminum alloy. In other embodiments, the fourth bridge 932 is other materials.

In the illustrated embodiment, the second teeth 936 of the second bridge 928 are in positions on the chainring 902 relative to the first crank arm 906 to enable at least one of the second teeth 936 to engage a chain (e.g., the chain 304) and apply a maximum force to the chain during a maximum torque portion of a pedaling cycle of the first crank arm 906. For example, the second teeth 936 may be consecutively disposed on the chainring 902 between a first predetermined angle (e.g., Angle 1 of FIG. 19) and a second predetermined angle (e.g., Angle 2 of FIG. 19) behind the first longitudinal axis 912 of the first crank arm 906 relative to a driving direction DD. For example, the second teeth 936 may be consecutively disposed on the chainring 902 between about 45 degrees and about 130 degrees behind the first longitudinal axis 912 of the first crank arm 906 relative to a driving direction DD. In other embodiments, the second teeth 936 are disposed on the chainring 902 behind the longitudinal axis 912 of the first crank arm 906 relative to the driving direction DD by other numbers of degrees such as, for example, between more than 60 degrees and less than 180 degrees, between 30 degrees and 210 degrees, between 60 degrees and 90 degrees, and/or by other number of degrees.

The third teeth 938 of the third bridge 930 are in positions on the chainring 902 relative to the second crank arm 908 to enable at least one of the second teeth 938 to engage the chain and apply a maximum force to the chain during a maximum torque portion of a pedaling cycle of the second crank arm 908. For example, the third teeth 938 may be consecutively disposed on the chainring 902 between a third predetermined angle (e.g., angle 3 of FIG. 19) and a fourth predetermined angle (e.g., angle 4 of FIG. 19) behind the second longitudinal axis 914 of the second crank arm 908 relative to the driving direction DD. In some embodiments, the third predetermined angle and/or the fourth predetermined angle are the same as the first predetermined angle and the second predetermined angle, respectively. In other embodiments, the third predetermined angle and/or the fourth predetermined angle are different than the first predetermined angle and/or the second predetermined angle, respectively.

The first teeth 934 of the first bridge 926 are in positions on the chainring 902 relative to the first crank arm 906 to enable at least one of the first teeth 934 to engage the chain and apply a minimum force to the chain during an initial minimum torque portion of the pedaling cycle of the first crank arm 906. Further, the first teeth 934 of the first bridge 926 are in positions on the chainring 902 relative to the second crank arm 908 to enable at least one of the first teeth 934 to engage the chain and apply a minimum force to the chain during a subsequent minimum torque portion of the pedaling cycle of the second crank arm 908. For example, the first teeth 934 are consecutively disposed on the chainring 902 between a fifth predetermined angle (e.g., Angle 5 of FIG. 19) in front of the first longitudinal axis 912 of the first crank arm 906 and sixth predetermined angle (e.g., Angle 6 of FIG. 19) behind the first longitudinal axis 712 of the first crank arm 906 relative to the driving direction DD. For example, the fifth predetermined angle may be about 40 degrees and the sixth predetermined angle may be about 40 degrees. In other embodiments, the first teeth 708 are in other positions relative to the first crank arm 906.

The fourth teeth 940 of the fourth bridge 932 are in positions on the chainring 902 relative to the first crank arm 906 to enable at least one of the fourth teeth 940 to engage the chain and apply a minimum force to the chain during the subsequent minimum torque portion of the pedaling cycle of the first crank arm 906. Further, the fourth teeth 940 of the fourth bridge 932 are in positions on the chainring 902 relative to the second crank arm 908 to enable at least one of the fourth teeth 940 to engage the chain and apply a minimum force to the chain during the subsequent minimum torque portion of the pedaling cycle of the second crank arm 908. For example, the fourth teeth 940 may be consecutively disposed on the chainring 902 between a seventh predetermined angle (e.g., Angle 7 of FIG. 19) in front of the second longitudinal axis 914 and an eighth predetermined angle (e.g., Angle 8 of FIG. 19) behind the second longitudinal axis 914 of the second crank arm 908 relative to the driving direction DD. In some embodiments, the seventh predetermined angle and/or the eighth predetermined angle are the same as the fifth predetermined angle and the sixth predetermined angle, respectively. In some embodiments, the seventh predetermined angle and/or the eighth predetermined angle are different than the fifth predetermined angle and/or the sixth predetermined angle, respectively.

Figure 20:
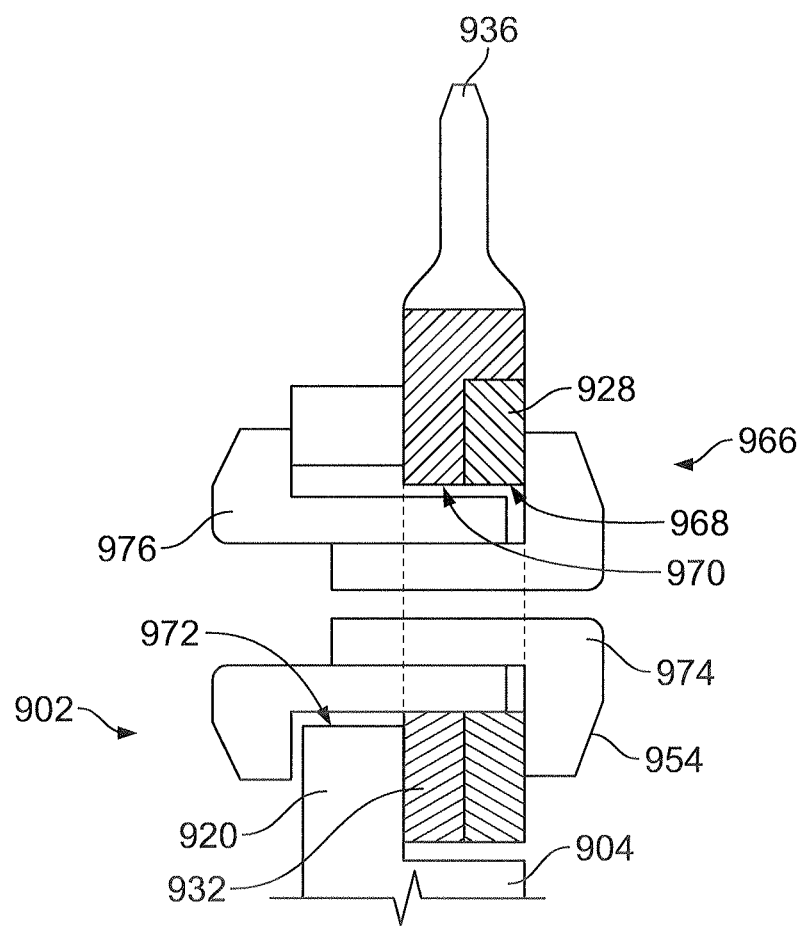
FIG. 20 is a cross-sectional view of a chainring of the crank assembly of FIG. 19 along line 20-20 of FIG. 19.

FIG. 20 is a cross-sectional view of the chainring 902 and the carrier 904 along line 20-20 of FIG. 19. FIG. 20 illustrates an example joint 966 removably coupling the second bridge 928 and the fourth bridge 932 to the third arm 920 of the carrier 904. In the illustrated embodiment, the third arm 920 overlaps the second bridge 928 and the fourth bridge 932 such that a first aperture 968 of the second bridge 928, a second aperture 970 of the fourth bridge 932, and a third aperture 972 of the third arm 920 are substantially coaxial. The third fastener 954 extends through the second bridge 928, the fourth bridge 932, and the third arm 920 of the carrier 904 via the first aperture 968, the second aperture 970, and the third aperture 972, respectively. The third fastener 954 of FIG. 20 includes a bolt 974 and a nut 976 threaded to the bolt 974. In other embodiments, the joint 966 employs one or more additional and/or alternative types of fasteners.

Figure 21:
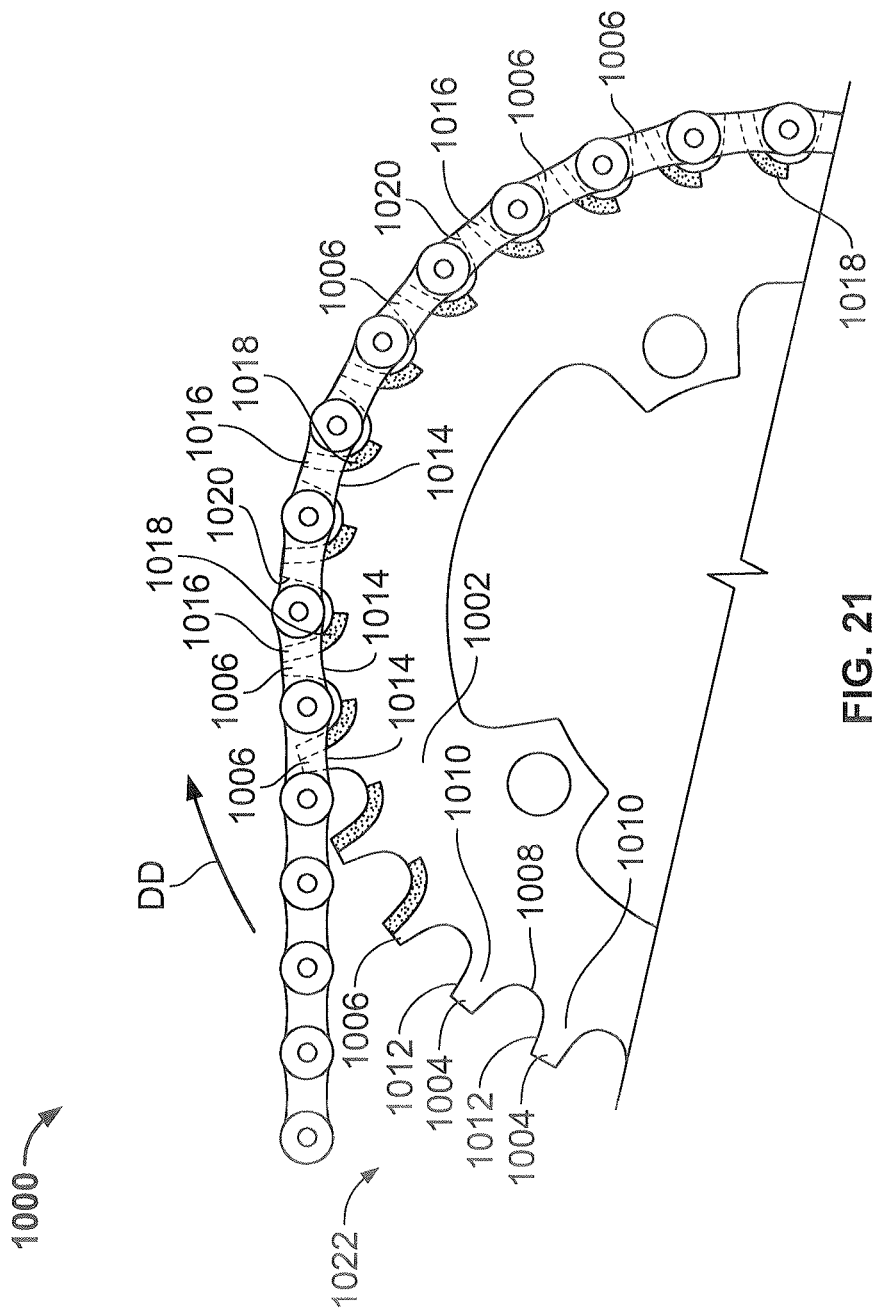
FIG. 21 is an outboard side, perspective view of another embodiment of a chainring disclosed herein, which may be used to implement any of the disclosed crank assemblies.

FIG. 21 is a different embodiment of a chainring 1000, which may be used to implement any of the disclosed crank assemblies, e.g., the example crank assembly 112 of FIG. 1, the example crank assembly 300 of FIG. 3, and/or the example crank assembly 900 of FIG. 19. In the illustrated embodiment, the chainring 1000 includes a body 1002. The chainring 1000 includes consecutive first teeth 1004 and consecutive second teeth 1006 disposed on a periphery 1008 of the body 1002. Each of the first teeth 1004 includes a first tooth body 1010 and a first load flank surface 1012. Each of the second teeth 1006 includes a second tooth body 1014 and an insert 1016 coupled to the second tooth body 1014. In the illustrated embodiment, each of the inserts 1016 forms a respective second load flank surface 1018 of the second teeth 1006. The inserts 1016 of FIG. 20 do not cover respective rear flank surfaces 1020 of the second teeth 1006. In other embodiments, the inserts 1016 cover the rear flank surfaces 1020 of the second teeth 1006.

In the illustrated embodiment, the first teeth 1004, including the first tooth bodies 1010 and the first load flank surfaces 1012, and the second tooth bodies 1014 are integrally formed and/or unitary. For example, the first teeth 1004, including the first tooth bodies 1010 and the first load flank surfaces 1012, and the second tooth bodies 1014 may be stamped from a single piece of a first material such as, for example, aluminum alloy. In other embodiments, the first teeth 1004, including the first tooth bodies 1010 and the first load flank surfaces 1012, and the second tooth bodies 1014 may be formed from a single piece of a material different than aluminum alloy and/or from two or more pieces. In some embodiments, the first load flank surfaces 1012 of the first teeth 1004 have a first wear resistance. In some embodiments, the first load flank surfaces 1012 of the first teeth 1004 have a first smoothness, a first hardness, and/or one or more additional and/or alternative characteristics enabling the first load flank surfaces 1012 to have the first wear resistance.

In the illustrated embodiment, the inserts 1016 are a second material different than the first material. For example, the inserts 1016 may be high carbon, alloyed steel; titanium alloy; and/or one or more additional and/or alternative materials. As a result, the second load flank surfaces 1018 formed by the inserts 1016 have a second wear resistance greater than the first wear resistance. In some embodiments, the second load flank surfaces 1018 of the second teeth 1006 have a second smoothness smoother than the first smoothness, a second hardness harder than the first hardness, a wear resistant coating, and/or one or more additional and/or alternative characteristics enabling the second teeth 1006 to have the second wear resistance.

The first crank arm 906, the second crank arm 908, and the carrier 904 of FIG. 19 may be coupled to the chainring 1000 to form a crank assembly. In such embodiments, the second teeth 1006 of the chainring 1000 may be positioned relative to the crank arm 906 to enable at least one of the second teeth 1006 to engage a chain 1022 and apply a maximum force to the chain 1022 during a maximum torque portion of the pedaling cycle of the first crank arm 906. For example, the second teeth 1006 may be consecutively disposed on the chainring 1000 between a first predetermined angle and a second predetermined angle behind the first longitudinal axis 912 of the first crank arm 906 relative to the driving direction DD as indicated in FIG. 19 by Angle 1 and Angle 2, respectively.

The first teeth 1004 are in positions on the chainring 1000 relative to the first crank arm 906 to enable at least one of the first teeth 1004 to engage the chain 1022 and apply a minimum force to the chain 1022 during the initial subsequent torque portion of the pedaling cycle of the first crank arm 906. Further, the first teeth 1004 are in positions on the chainring 1000 relative to the second crank arm 908 to enable at least one of the first teeth 1004 to engage the chain 1022 and apply a minimum force to the chain 1022 during the initial minimum torque portion of the pedaling cycle of the second crank arm 908. For example, the first teeth 1004 may be consecutively disposed on the chainring 1000 between a third predetermined angle in front of the first longitudinal axis 912 of the first crank arm 906 relative to the driving direction DD and a fourth predetermined angle behind the first longitudinal axis 912 of the first crank arm 906 relative to the driving direction DD as indicated in FIG. 19 by Angle 7 and Angle 8, respectively.

Figure 22:
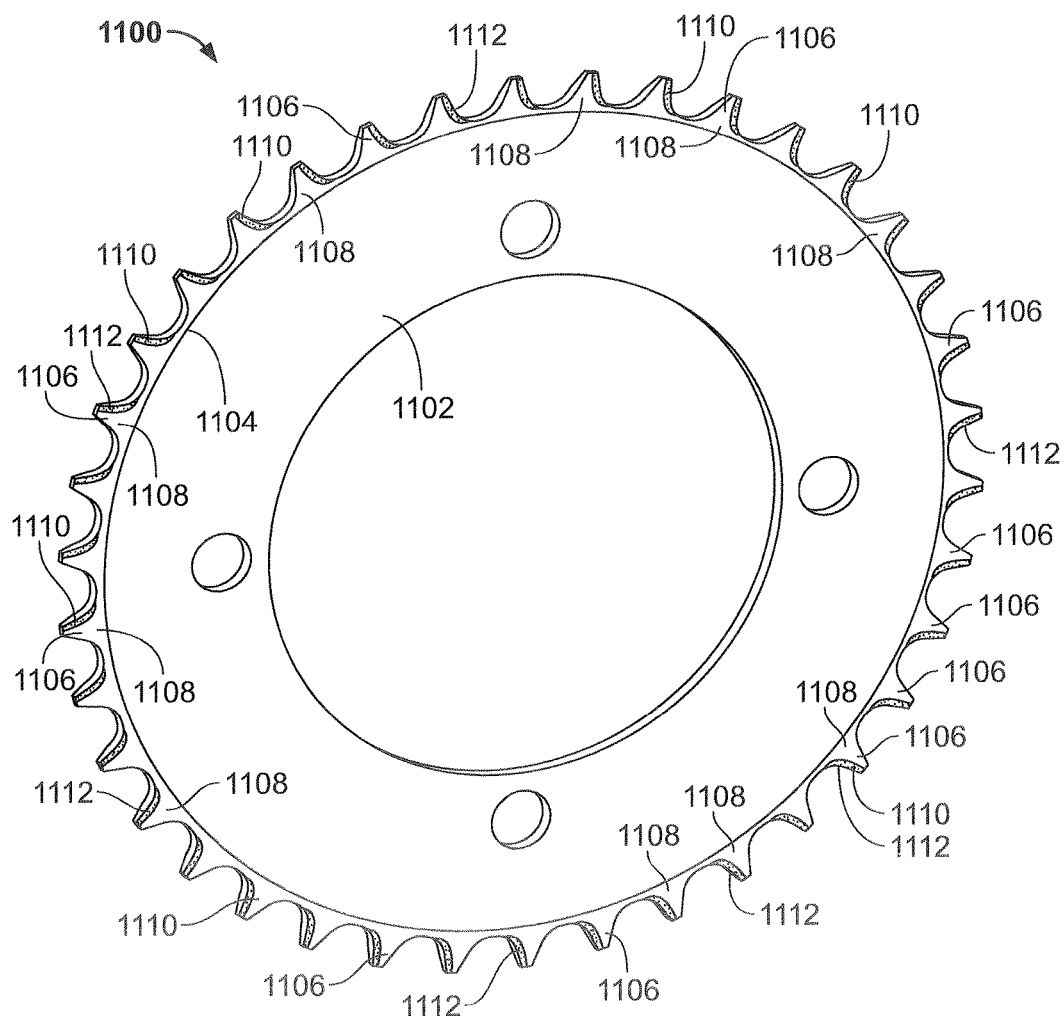
FIG. 22 is an outboard side, perspective view of still another embodiment of a chainring disclosed herein, which may be used to implement any of the crank assemblies disclosed herein.

FIG. 22 is a perspective view of another example chainring 1100 disclosed herein. In the illustrated embodiment, the chainring 1100 includes a body 1102 having a periphery 1104. Teeth 1106 are consecutively disposed on the periphery 1104. Each of the teeth 1106 of FIG. 22 includes a tooth body 1108 and an insert 1110 coupled to the tooth body 1108. Each of the inserts 1110 forms a load flank surface 1112 for each of the teeth 1106.

In the illustrated embodiment, the tooth bodies 1108 and the body 1102 of the chainring 1100 are integrally formed and/or unitary. For example, the tooth bodies 1108 and the body 1102 of the chainring 1100 may be stamped from a single piece of a first material such as, for example, aluminum alloy. In other embodiments, the tooth bodies 1108 and body 1102 may be formed from a single piece of a material different than aluminum alloy and/or from two or more pieces.

In the illustrated embodiment, the inserts 1110 are a second material different than the first material. For example, the inserts 1110 may be high carbon, alloyed steel; titanium alloy; and/or one or more additional and/or alternative materials. As a result, the load flank surfaces 1112 formed by the inserts 1110 have a wear resistance greater than if the load flank surfaces 1112 were formed from the first material. In some embodiments, the load flank surfaces 1112 have a predetermined smoothness, a predetermined hardness, a wear resistant coating, and/or one or more additional and/or alternative characteristics enabling the teeth 1106 to have the wear resistance.

Numerous modifications to the embodiments disclosed herein will be apparent to those skilled in the art in view of the foregoing description. For example, any of the embodiments disclosed herein may be modified to include any of the structures or/or methodologies disclosed in connection with different embodiments. Accordingly, this disclosure is to be construed as illustrative only and is presented for the purpose of enabling those skilled in the art to make and use the invention and to teach the best mode of carrying out same. The exclusive rights to all modifications which come within the scope of the appended claims are reserved.

What is claimed is:

1. A chainring for a bicycle comprising:
a body; and
a plurality of teeth disposed about a periphery of the body, the plurality of teeth formed of a first material and comprising a first tooth having a first load flank having a first load flank surface and a second tooth adjacent to the first tooth and having a second load flank, the second tooth including an insert coupled to a tooth body of the second tooth, the insert forming a second load flank surface of the second tooth, the second tooth having a second rear flank having a second rear flank surface, the second rear flank surface being free of the insert.

2. The chainring of claim 1, wherein the insert is formed of a second material, different than the first material.

3. The chainring of claim 2, wherein the first load flank surface is formed of the first material.

4. The chainring of claim 1, wherein the first tooth is free of the insert.

5. The chainring of claim 1, wherein the first load flank surface formed of the first material has a first hardness, and the second load flank surface formed of a second material has a second hardness, the second hardness higher than the first hardness.

6. The chainring of claim 1, wherein the insert is formed of the first material.

7. The chainring of claim 1, wherein the tooth body of the second tooth and the insert are formed as a single piece.

8. A chainring for a bicycle comprising:
a body; and
a plurality of teeth disposed about a periphery of the body, the plurality of teeth having a body formed of a first material and a load flank, the plurality of teeth including an insert formed of a second material, the insert coupled to a tooth body of the plurality of teeth forming a load flank surface of the plurality of teeth, the plurality of teeth including a rear flank surface, the rear flank surface being free of the insert.

9. The chainring of claim 8, wherein the second material is different than the first material.

10. The chainring of claim 9, wherein the second material has a greater wear resistance than the first material.

11. The chainring of claim 10, wherein the first material is an aluminum or aluminum alloy.

12. The chainring of claim 11, wherein the second material includes one of a steel or titanium.

13. The chainring of claim 9, wherein the tooth body and the insert are formed as a single piece.

14. The chainring of claim 8, wherein the chainring comprises a second plurality of teeth disposed about the periphery of the body, the second plurality of teeth being free of the insert.

* * * * *